US008339337B2

(12) United States Patent
Yamashita et al.

(10) Patent No.: US 8,339,337 B2
(45) Date of Patent: Dec. 25, 2012

(54) DISPLAY APPARATUS, DISPLAY-APPARATUS DRIVING METHOD AND ELECTRONIC INSTRUMENT

(75) Inventors: Junichi Yamashita, Tokyo (JP); Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1106 days.

(21) Appl. No.: 12/285,870

(22) Filed: Oct. 15, 2008

(65) Prior Publication Data

US 2009/0115709 A1 May 7, 2009

(30) Foreign Application Priority Data

Nov. 7, 2007 (JP) ................................ 2007-289309

(51) Int. Cl.

| | |
|---|---|
| ***G09G 3/30*** | (2006.01) |
| ***G09G 3/20*** | (2006.01) |
| ***G09G 5/00*** | (2006.01) |
| ***G09G 3/10*** | (2006.01) |
| ***G06F 3/038*** | (2006.01) |

(52) U.S. Cl. .............. 345/76; 345/55; 345/80; 345/211; 345/212; 315/169.3

(58) Field of Classification Search ..................... 345/76
See application file for complete search history.

(56) References Cited

U.S. PATENT DOCUMENTS

| | | | | |
|---|---|---|---|---|
| 8,004,477 | B2 * | 8/2011 | Uchino et al. | 345/76 |
| 2007/0115225 | A1 * | 5/2007 | Uchino et al. | 345/76 |

FOREIGN PATENT DOCUMENTS

| | | |
|---|---|---|
| JP | 2006-133542 | 5/2006 |
| JP | 2007-133284 A | 5/2007 |
| JP | 2007-171828 A | 7/2007 |

OTHER PUBLICATIONS

Japanese Office Action issued Dec. 1, 2009 for corresponding Japanese Application No. 2007-289309.

* cited by examiner

*Primary Examiner* — Sumati Lefkowitz
*Assistant Examiner* — Andrew Yeretsky
(74) *Attorney, Agent, or Firm* — Rader, Fishman & Grauer, PLLC

(57) ABSTRACT

Disclosed herein is a display apparatus including: a pixel array section including pixel circuits each having an electro optical device, a signal writing transistor, a signal storage capacitor, and a device driving transistor; and a pixel driving section, wherein: in a no-light emission period, the pixel driving section carries out a threshold-voltage correction process by changing an electric potential appearing on an electrode of the device driving transistor close to the electro optical device toward an electric potential obtained by subtracting the threshold voltage of the device driving transistor from the initialization electric potential of the gate electrode of the device driving transistor and a mobility correction process of negatively feeding a current flowing through the device driving transistor back to the gate electrode of the device driving transistor; and when a current is not flowing through the device driving transistor, the pixel driving section applies a positive bias voltage to the gate electrode of the signal writing transistor.

4 Claims, 15 Drawing Sheets

FIG.20A
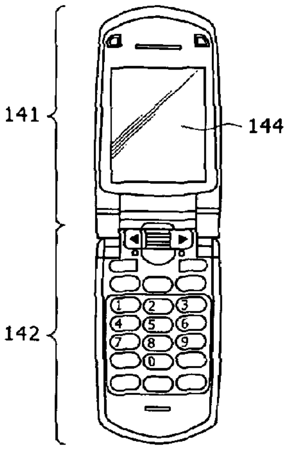
FIG.20B
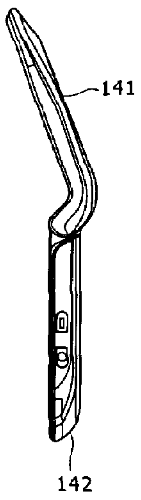
FIG.20D
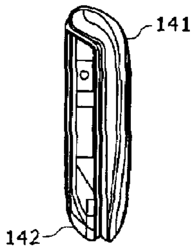
FIG.20F
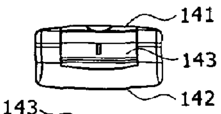
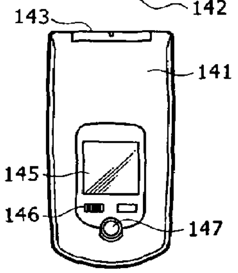
FIG.20C
FIG.20E
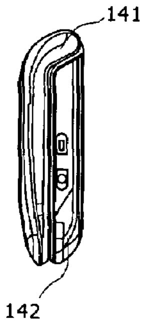
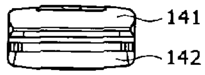
FIG.20G

DISPLAY APPARATUS, DISPLAY-APPARATUS DRIVING METHOD AND ELECTRONIC INSTRUMENT

CROSS REFERENCES TO RELATED APPLICATIONS

The present invention contains subject matter related to Japanese Patent Application JP 2007-289309 filed in the Japan Patent Office on Nov. 7, 2007, the entire contents of which being incorporated herein by reference.

BACKGROUND OF THE INVENTION

1. Field of the Invention

In general, the present invention relates to a display apparatus, a display-apparatus driving method and an electronic instrument. In particular, the present invention relates to a display apparatus having the type of a flat panel having pixels laid out two-dimensionally to form a matrix as pixels each including an electro optical device and relates to a method for driving the display apparatus as well as an electronic instrument employing the display apparatus.

2. Description of the Related Art

In recent years, in the field of display apparatus for displaying images, a display apparatus having the type of a flat panel having pixels laid out two-dimensionally to form a matrix as pixels each including a light emitting device has been becoming popular at a high pace. In the following description, a pixel is also referred to as a pixel circuit. The light emitting device employed in each pixel circuit of a flat-panel display apparatus as a light emitting device of the so-called current-driven type in which the luminance of light emitted by the light emitting device varies in accordance with the magnitude of a current flowing through the device. An example of a flat-panel display apparatus employing light emitting devices of the so-called current-driven type is an organic EL (Electro Luminescence) display apparatus. An organic EL display apparatus employs organic EL devices each making use of a phenomenon in which light is generated when an electric field is applied to an organic thin film of the organic EL device.

An organic EL display apparatus has the following characteristics. An organic EL device has a low power consumption since the device is capable of operating even if the device is driven by a low applied voltage not exceeding 10 V. In addition, since an organic EL device is a device generating light by itself, an image generated by the light exhibits a high degree of recognizability in comparison with a liquid-crystal display apparatus displaying an image in accordance with an operation to control the luminance of light generated by a light source known as a backlight for a liquid crystal employed in every pixel circuit. On top of that, since an organic EL display apparatus does not require an illumination member such as a backlight, the apparatus can be made light and thin with ease. Moreover, since an organic EL device has a very short response time of about few microseconds, no residual image is generated at a display time of a moving image.

Much like a liquid-crystal display apparatus, the organic EL display apparatus can adopt either a passive or active matrix method as its driving method. However, even though a display apparatus adopting the passive matrix method has a simple structure, the light emission period of the electro optical device decreases as the number of scan lines (that is, the number of pixel circuits) increases. Thus, the organic EL display apparatus raises a problem of difficulties in implementing a large-size and high-definition model.

For the reason described above, display apparatus adopting the active matrix method are developed extensively in recent years. In accordance with the active matrix method, an active device for controlling a current flowing through an electro optical device is provided in the same pixel circuit as the electro optical device. An example of the active device is a field effect transistor of the insulated-gate type. The field effect transistor of the insulated-gate type is generally a TFT (Thin Film Transistor). In a display apparatus adopting the active matrix method, each electro optical device is capable of sustaining the state of emitting light throughout the period of one frame. It is thus easy to implement a large-size and high-definition display apparatus adopting the active matrix method.

By the way, an I-V characteristic exhibited by the organic EL device as a characteristic representing a relation between a voltage applied to the device and a current flowing to the device as a result of applying the voltage thereto generally deteriorates with the lapse of time as is commonly known. The deterioration with the lapse of time is referred to as time degradation. In a pixel circuit employing a TFT of the N-channel type as a device driving transistor for flowing a current to the organic EL device included in the pixel circuit, the source electrode of the TFT is connected to the organic EL device. Thus, due to the time degradation of the I-V characteristic exhibited by the organic EL device, a voltage Vgs applied between the gate and source electrodes of the device driving transistor changes and, as a result, the luminance of light emitted by the organic EL device also changes as well.

What is described above is explained more concretely as follows. An electric potential appearing on the source electrode of a device driving transistor is determined by the operating point of the device driving transistor and the organic EL device. Due to the time degradation, the operating point of the device driving transistor and the organic EL device changes undesirably. Thus, even if the voltage applied to the gate electrode of the device driving transistor remains unchanged, the electric potential appearing on the source electrode of a device driving transistor changes. That is to say, the voltage Vgs applied between the gate and source electrodes of the device driving transistor changes. Thus, a current flowing through the device driving transistor changes. As a result, a current flowing through the organic EL device also changes as well so that the luminance of light emitted by the organic EL device varies.

In addition, in a pixel circuit employing a poly-silicon TFT as the device driving transistor, besides the time degradation of the organic EL device, the threshold voltage Vth of the device driving transistor and the mobility $\mu$ of a semiconductor thin film forming a channel of the device driving transistor included in the device driving transistor also change due to the time degradation. In the following description, the mobility $\mu$ of a semiconductor thin film included in the device driving transistor is referred to simply as the mobility $\mu$ of the device driving transistor. In addition, the characteristics of the threshold voltage Vth and the mobility $\mu$ also change from pixel to pixel due to variations in manufacturing process. That is to say, there are transistor variations among individual pixel characteristics.

If the threshold voltage Vth and mobility $\mu$ of the device driving transistor change from pixel to pixel, the current flowing through the device driving transistor also changes from pixel to pixel as well. Thus, even if the voltage applied to the gate electrode of the device driving transistor remains unchanged, the luminance of light emitted by the organic EL device also varies from pixel to pixel as well. As a result, screen uniformity is lost.

In order to sustain the luminance of light emitted by the organic EL device at a constant value not affected by variations of the I-V characteristic of the organic EL device, variations of the threshold voltage Vth and variations of the mobility μ of the device driving transistor for a constant voltage applied to the gate electrode of the device driving transistor even if the characteristic of the organic EL device, the threshold voltage Vth and the mobility μ change due to the time degradation, as disclosed in documents such as Japanese Patent Laid-open No. 2006-133542, it is thus necessary to provide a configuration including a compensation function for correcting the luminance of light emitted by the organic EL device for variations of the I-V characteristic of the organic EL device, a compensation function for correcting the luminance of light emitted by the organic EL device for variations of the threshold voltage Vth of the device driving transistor and a compensation function for correcting the luminance of light emitted by the organic EL device for variations of the mobility μ of the device driving transistor. In the following description, the process of correcting the luminance of light emitted by the organic EL device for variations of the threshold voltage Vth of the device driving transistor is referred to as a threshold-voltage correction process whereas the process of correcting the luminance of light emitted by the organic EL device for variations of the mobility μ of the device driving transistor is referred to as a mobility correction process.

By providing each pixel circuit with a compensation function for correcting the luminance of light emitted by the organic EL device for variations of the I-V characteristic of the organic EL device, a compensation function for correcting the luminance of light emitted by the organic EL device for variations of the threshold voltage Vth of the device driving transistor and a compensation function for correcting the luminance of light emitted by the organic EL device for variations of the mobility μ of the device driving transistor as described above, it is possible to sustain the luminance of light emitted by the organic EL device at a constant value not affected by variations of the characteristic of the organic EL device, variations of the threshold voltage Vth and variations of the mobility μ of the device driving transistor for a constant voltage applied to the gate electrode of the device driving transistor even if the characteristic of the organic. EL device, the threshold voltage Vth and the mobility μ change due to the time degradation. Thus, the display quality of the organic EL display apparatus can be improved.

SUMMARY OF THE INVENTION

In accordance with a method adopted for driving a pixel circuit by making use of functions to correct the luminance of light emitted by the organic EL device for variations of the I-V characteristic of the organic EL device, variations of the threshold voltage Vth of the device driving transistor and variations of the mobility μ of the device driving transistor as described above, in a light emission period of the organic EL device, a negative bias voltage such as a voltage of about −3 V is applied to the gate electrode of a signal writing transistor, which is employed in the pixel circuit as a transistor for sampling a video signal and writing the sampled video signal into the pixel circuit, in order to put the signal writing transistor in a non-conductive state preventing the transistor from sampling a video signal and writing the sampled video signal into the pixel circuit. In the following description, the signal writing transistor is also referred to as a signal sampling transistor.

On the other hand, the source electrode of a signal writing transistor employed in each of pixel circuits on the same pixel column of the matrix of pixel circuits is connected to a common signal line. A video signal conveyed by a signal line connected to the source electrode of the signal writing transistor employed in every pixel circuit on the same pixel column is represented by an electric potential asserted on the signal line as an electric potential varying in the range 0 to 6 V. That is to say, an electric potential in the range 0 to 6 V appears on the source electrode of the signal writing transistor. When a pixel row is in a light emission period, however, an operation to write a video signal is carried out on the other pixel rows, thus a negative bias voltage is applied to the gate electrode of the signal writing transistor. In general, a negative bias voltage means an electric potential applied to the gate electrode as an electric potential lower than an electric potential applied to the source electrode as an electric potential varying in the range 0 to 6 V.

The negative bias voltage applied to the gate electrode of a signal writing transistor in a light emission period as described above shifts the transistor characteristic representing the characteristic of the threshold voltage Vth of the signal writing transistor from a characteristic in an enhancement state to a characteristic in a depletion state. The enhancement state is a state in which a current flows from the source electrode of the signal writing transistor to the drain electrode of the signal writing transistor through a channel created by the write pulse applied to the gate electrode of the signal writing transistor. On the other hand, the depletion state is a state in which a current flows from the source electrode of the signal writing transistor to the drain electrode of the signal writing transistor due to no write pulse applied to the gate electrode of the signal writing transistor. In the following description, the transistor characteristic representing the characteristic of the threshold voltage Vth of a signal writing transistor is referred to simply as the Vth characteristic of the signal writing transistor.

When the Vth characteristic of a signal writing transistor is shifted to a depletion side, the operating point of a mobility correction process is also shifted as well, lengthening the time period of the process as will be described later in detail. Thus, the mobility correction process is carried out excessively. As a result, a light emission current of the organic EL device undesirably decreases in a gradual manner. Since the gradual decrease of the light emission current causes the luminance of the flat panel of the display apparatus to deteriorate with the lapse of time, it is necessary to provide a countermeasure for preventing the Vth characteristic of a signal writing transistor from being shifted to a depletion side due to the negative bias voltage applied to the gate electrode of the signal writing transistor during a light emission period.

Addressing the problems described above, inventors of the present invention have innovated a display apparatus capable of preventing the light emission current from decreasing due to a shift caused by a negative bias voltage as a shift of the Vth characteristic of the signal writing transistor to a depletion side. The inventors have also innovated a method for driving the display apparatus and an electronic instrument employing the display apparatus.

A display apparatus according to an embodiment of the present invention employs:

a pixel array section including pixel circuits laid out to form a matrix as pixel circuits each having a signal writing transistor for writing a video signal into a signal storage capacitor, the signal storage capacitor used for storing a video signal written by the signal writing transistor, a device driving transistor for driving an electro optical device in accordance with a video signal stored in the signal storage capacitor, and the electro optical device for converting a video signal stored in the signal storage capacitor into a light beam.

The display apparatus further employs a pixel driving section configured to drive each of the pixel circuits included in the pixel array section.

In the display apparatus, in a no-light emission period of the electro optical device, the pixel driving section first of all carries out a threshold-voltage correction process making use of an initialization electric potential of the gate electrode of the device driving transistor as a reference and changing an electric potential appearing on an electrode pertaining to the device driving transistor as an electrode close to the electro optical device toward an electric potential obtained as a result of subtracting the threshold voltage of the device driving transistor from the initialization electric potential and, then, carries out a mobility correction process to negatively feed a current flowing through the device driving transistor back to the gate electrode of the device driving transistor. In the display apparatus, when a current is not flowing through the device driving transistor, the pixel driving section applies a positive bias voltage to the gate electrode of the signal writing transistor.

According to another embodiment of the present invention, there is provided a driving method for driving a display apparatus having a pixel array section including pixel circuits laid out to form a matrix as pixel circuits each having a signal writing transistor for writing a video signal into a signal storage capacitor, the signal storage capacitor used for storing a video signal written by the signal writing transistor, a device driving transistor for driving an electro optical device in accordance with a video signal stored in the signal storage capacitor, and the electro optical device for converting a video signal stored in the signal storage capacitor into a light beam. The driving method employs the steps of:

carrying out, in a no-light emission period of the electro optical device, a threshold-voltage correction process making use of an initialization electric potential of the gate electrode of the device driving transistor as a reference and changing an electric potential appearing on an electrode pertaining to the device driving transistor as an electrode close to the electro optical device toward an electric potential obtained as a result of subtracting the threshold voltage of the device driving transistor from the initialization electric potential, and carrying out a mobility correction process to negatively feed a current flowing through the device driving transistor back to the gate electrode of the device driving transistor, and applying, when a current is not flowing through the device driving transistor, a positive bias voltage to the gate electrode of the signal writing transistor.

An electronic instrument according to further another embodiment of the present invention employing a display apparatus employs:

a pixel array section including pixel circuits laid out to form a matrix as pixel circuits each having a signal writing transistor for writing a video signal into a signal storage capacitor, the signal storage capacitor used for storing a video signal written by the signal writing transistor, a device driving transistor for driving an electro optical device in accordance with a video signal stored in the signal storage capacitor, and the electro optical device for converting a video signal stored in the signal storage capacitor into a light beam; and a pixel driving section configured to drive each of the pixel circuits included in the pixel array section.

In the electronic instrument, in a no-light emission period of the electro optical device, the pixel driving section first of all carries out a threshold-voltage correction process making use of an initialization electric potential of the gate electrode of the device driving transistor as a reference and changing an electric potential appearing on an electrode pertaining to the device driving transistor as an electrode close to the electro optical device toward an electric potential obtained as a result of subtracting the threshold voltage of the device driving transistor from the initialization electric potential and, then, carries out a mobility correction process to negatively feed a current flowing through the device driving transistor back to the gate electrode of the device driving transistor, and when a current is not flowing through the device driving transistor, the pixel driving section applies a positive bias voltage to the gate electrode of the signal writing transistor.

In a display apparatus having a configuration for sequentially carrying out the threshold-voltage correction process and the mobility correction process in a no-light emission period of the electro optical device as described above and an electronic instrument employing such a display apparatus, when a current is not flowing through the device driving transistor in a no-light emission period of the electro optical device, the pixel driving section deliberately applies a positive bias voltage to the gate electrode of the signal writing transistor in order to shift the Vth characteristic of the signal writing transistor to an enhancement side. By shifting the Vth characteristic of the signal writing transistor to an enhancement side in a no-light emission period of the electro optical device as described above, it is possible to neutralize a shift caused by a negative bias voltage applied to the gate electrode of the signal writing transistor during a light emission period leading ahead of the no-light emission period as a shift of the Vth characteristic to a depletion side. As a result, it is possible to prevent the operating point of the mobility correction process from changing.

In accordance with the embodiments of the present invention, when a current is not flowing through the device driving transistor in a no-light emission period of the electro optical device, the pixel driving section applies a positive bias voltage to the gate electrode of the signal writing transistor in order to shift the Vth characteristic of the signal writing transistor to an enhancement side. It is thus possible to neutralize a shift caused by a negative bias voltage applied to the gate electrode of the signal writing transistor during a light emission period of the electro optical device when a current is flowing through the device driving transistor as a shift of the Vth characteristic to a depletion side. As a result, a light emission current can be prevented from decreasing due to a shift occurring in the light emission period leading ahead of the no-light emission period as a shift of the Vth characteristic to the depletion side.

BRIEF DESCRIPTION OF THE DRAWINGS

FIG. 9A is a diagram showing two curves for different pixel circuits A and B respectively which are subjected to neither a threshold-voltage correction process nor a mobility correction process; FIG. 9B is a diagram showing two curves for different pixel circuits A and B respectively which are subjected to a threshold-voltage correction process but not subjected to a mobility correction process; and FIG. 9C is a diagram showing two curves for different pixel circuits A and B respectively which are subjected to both a threshold-voltage correction process and a mobility correction process;

FIG. 17A is a diagram of the digital camera seen from a position on the front side of the digital camera; and FIG. 17B is a diagram of the digital camera seen from a position on the rear side of the digital camera;

FIGS. 20A to 20G are a plurality of diagrams each showing the external appearance of a portable terminal such as a cellular phone to which an embodiment of the present invention is applied; FIG. 20A is a diagram showing the front view of the cellular phone in a state of being already opened; FIG. 20B is a diagram showing a side of the cellular phone in a state of being already opened; FIG. 20C is a diagram showing the front view of the cellular phone in a state of being already closed; FIG. 20D is a diagram showing the left side of the cellular phone in a state of being already closed; FIG. 20E is a diagram showing the right side of the cellular phone in a state of being already closed; FIG. 20F is a diagram showing the top view of the cellular phone in a state of being already closed; and FIG. 20G is a diagram showing the bottom view of the cellular phone in a state of being already closed.

DETAILED DESCRIPTION OF THE PREFERRED EMBODIMENTS

Embodiments of the present invention are explained in detail by referring to diagrams as follows.

System Configuration

Figure 1:
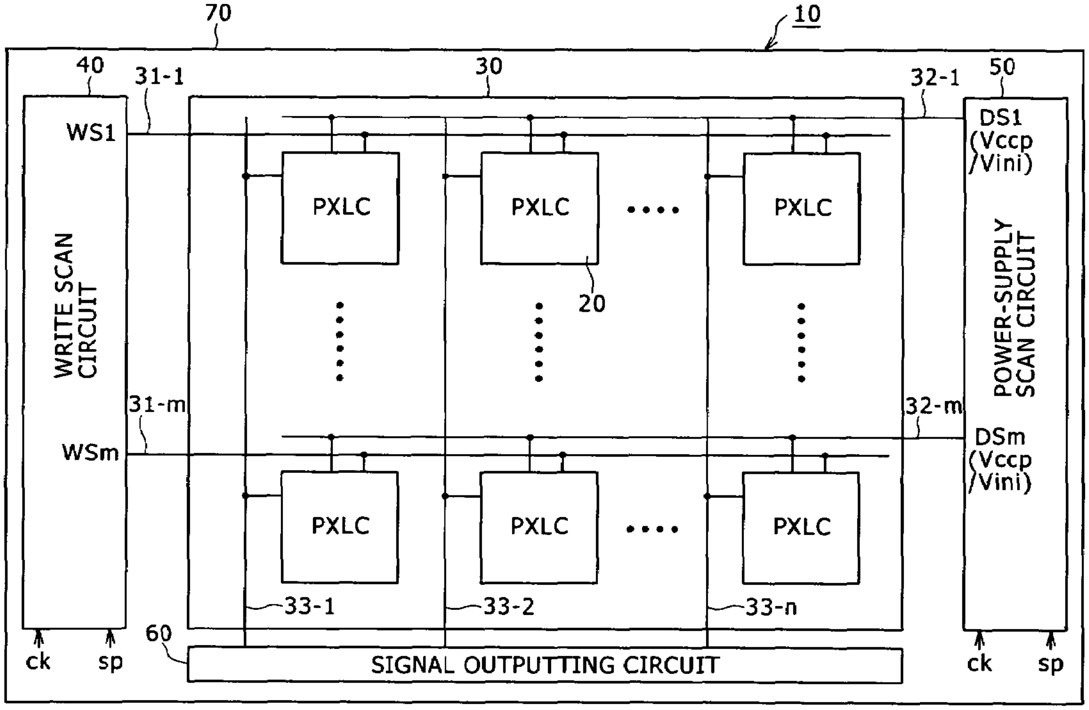
FIG. 1 is a block diagram showing a rough configuration of an active-matrix organic EL display apparatus to which an embodiment of the present invention is applied.

FIG. 1 is a block diagram showing a rough system configuration of an active-matrix organic EL (Electro Luminescence) display apparatus to which an embodiment of the present invention is applied.

An example of the active-matrix display apparatus explained below is an active-matrix organic EL display apparatus 10 making use of current-driven electro optical devices as the light emitting devices each employed in one of pixel circuits included in the active-matrix organic EL display apparatus 10. The current-driven electro optical device changes its light emission luminance in accordance with the magnitude of a current flowing through the device. An example of the current-driven electro optical device is an organic EL device.

As shown in the block diagram of FIG. 1, the active-matrix organic EL display apparatus 10 has a configuration including a pixel array section 30 and driving sections placed in the peripheries of the pixel array section 30 as driving sections each used for driving pixel circuits (PXLCs) 20 employed in the pixel array section 30. In the pixel array section 30, the pixel circuits 20 each including a light emitting device are arranged two-dimensionally to form a pixel matrix. The driving sections are typically a write scan circuit 40, a power-supply scan circuit 50 and a signal outputting circuit 60.

In the case of an active-matrix organic EL display apparatus 10 for showing a color display, each of the pixel circuits 20 includes a plurality of sub-pixel circuits each functioning as a pixel circuit 20. To put it more concretely, in an active-matrix organic EL display apparatus 10 for showing a color display, each of the pixel circuits 20 includes three sub-pixel circuits, i.e., a sub-pixel circuit for emitting red light (that is, light of the R color), a sub-pixel circuit for emitting green light (that is, light of the G color) and a sub-pixel circuit for emitting blue light (that is, light of the B color).

However, combinations of sub-pixel circuits functioning as a pixel circuit are by no means limited to the above combination of the sub-pixel circuits for the three primary colors, i.e., the R, G and B colors. For example, a sub-pixel circuit of another color or even a plurality of sub-pixel circuits for a plurality of other colors can be added to the sub-pixel circuits for the three primary colors to function as a pixel circuit. To put it more concretely, for example, a sub-pixel circuit for generating light of the white (W) color for increasing the luminance can be added to the sub-pixel circuits for the three primary colors to function as a pixel circuit. As another example, sub-pixel circuits each used for generating light of a complementary color are added to the sub-pixel circuits for the three primary colors to function as a pixel circuit with an increased color reproduction range.

For the m-row/n-column matrix of pixel circuits 20 arranged to form m rows and n columns in the pixel array section 30, scan lines 31-1 to 31-*m* and power-supply lines 32-1 and 32-*m* are provided, being oriented in a first direction which is the left-to-right direction or the horizontal direction in the block diagram of FIG. 1. To be more specific, each of the scan lines 31-1 to 31-*m* and each of the power-supply lines 32-1 and 32-*m* are provided for each of the m rows of the matrix of pixel circuits 20. In addition, the m-row/n-column matrix of pixel circuits 20 in the pixel array section 30 is also provided with signal lines 33-1 to 33-*n* each oriented in a second direction which is the up-down direction or the vertical direction and perpendicular to the first direction in the block diagram of FIG. 1. To be more specific, each of the signal lines 33-1 to 33-*n* is provided for each of the n columns of the matrix of pixel circuits 20.

Any specific one of the scan lines 31-1 to 31-*m* is connected to an output terminal employed in the write scan circuit 40 as an output terminal associated with a row for which the specific scan line 31 is provided. By the same token, any specific one of the power-supply lines 32-1 to 32-*m* is connected to an output terminal employed in the power-supply scan circuit 50 as an output terminal associated with a row for which the specific power-supply line 32 is provided. On the other hand, any specific one of the signal lines 33-1 to 33-*n* is connected to an output terminal employed in the signal outputting circuit 60 as an output terminal associated with a column for which the specific signal line 33 is provided.

The pixel array section 30 is normally created on a transparent insulation substrate such as a glass substrate. Thus, the active-matrix organic EL display apparatus 10 can be constructed to have a flat panel structure. Each of the write scan circuit 40, the power-supply scan circuit 50 and the signal outputting circuit 60 each functioning as a driving circuit for driving the pixel circuits 20 included in the pixel array section 30 can be composed of amorphous silicon TFTs (Thin Film Transistors) or low-temperature silicon TFTs. If low-temperature silicon TFTs are used, the write scan circuit 40, the power-supply scan circuit 50 and the signal outputting circuit 60 can also be created on a display panel 70 (or the substrate) composing the pixel array section 30.

The write scan circuit 40 includes a shift register for sequentially shifting (propagating) a start pulse sp in synchronization with a clock pulse signal ck. In an operation to write video signals into the pixel circuits 20 employed in the pixel array section 30, the write scan circuit 40 sequentially supplies the start pulse sp as one of write pulses (or scan signals) WS1 to WSm to one of the scan lines 31-1 to 31-*m*. The write pulses supplied to the scan lines 31-1 to 31-*m* are thus used for scanning the pixel circuits 20 employed in the pixel array section 30 sequentially in row units in the so-called a line-by-line sequential scan operation to put pixel circuits 20 provided on the same row in a state of being enabled to receive the video signals at one time.

By the same token, the power-supply scan circuit 50 also includes a shift register for sequentially shifting (propagating) a start pulse sp in synchronization with a clock pulse signal ck. In synchronization with the line-by-line sequential scan operation carried out by the write scan circuit 40, that is, with timings determined by the start pulse sp, the power-supply scan circuit 50 supplies power-supply line electric potentials DS1 to DSm to the power-supply lines 32-1 to 32-*m* respectively. Each of the power-supply line electric potentials DS1 to DSm is switched from a first power-supply electric potential Vccp to a second power-supply electric potential Vini lower than the first power-supply electric potential Vccp and vice versa in order to control the light emission state and no-light emission state of the pixel circuits 20 in row units and in order to supply a current to organic EL devices, which are each employed in the pixel circuit 20 as a light emitting device, in row units.

The signal outputting circuit 60 properly selects the voltage Vsig of a video signal representing luminance information received from a signal source not shown in the block diagram of FIG. 1 or a reference electric potential Vofs and writes the selected one to the pixel circuits 20 employed in the pixel array section 30 typically in row units through the signal lines 33-1 to 33-*n*. The reference electric potential Vofs is the aforementioned initialization electric potential of the gate electrode of a device driving transistor 22 employed in the pixel circuit 20. In the following description, the video-signal voltage Vsig, which is the voltage of a video signal representing luminance information received from the signal source, is also referred to as a signal voltage. That is to say, the signal outputting circuit 60 adopts a driving method of a line-by-line sequential writing operation for writing the video-signal voltage Vsig into pixel circuits 20 in a state of being enabled to receive the video-signal voltage Vsig in row units.

The reference electric potential Vofs is an electric potential used as a reference of the video-signal voltage Vsig representing luminance information received from the signal source. The reference electric potential Vofs is typically an electric potential representing the black level. The second power-supply electric potential Vini mentioned above is lower than the reference electric potential Vofs. For example, the second power-supply electric potential Vini is lower than (Vofs−Vth) where notation Vth denotes the threshold voltage of a device driving transistor 22 employed in the pixel circuit 20. It is desirable to set the second power-supply electric potential Vini at an electric potential sufficiently lower than (Vofs−Vth).

Pixel Circuits

Figure 2:
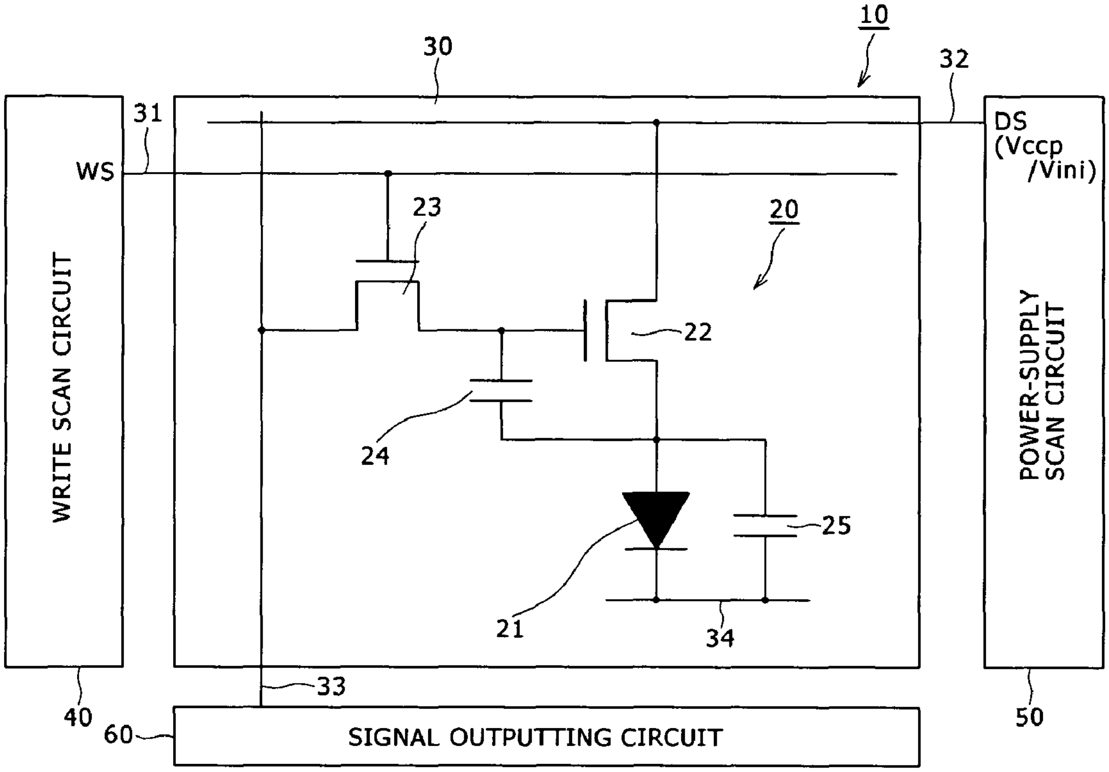
FIG. 2 is a diagram showing a concrete typical configuration of a pixel circuit employed in the organic EL display apparatus.

FIG. 2 is a diagram showing a concrete typical configuration of the pixel circuit 20.

As shown in the diagram of FIG. 2, driven by the write scan circuit 40, the power-supply scan circuit 50 and the signal outputting circuit 60, the pixel circuit 20 includes an organic EL device 21 serving as an electro optical device which changes the luminance of light generated thereby in accordance with the magnitude of a current flowing through the device. The cathode electrode of the organic EL device 21 is connected to a common power-supply line 34 common to all pixel circuits 20. The common power-supply line 34 is also referred to as a beta line.

In addition to the organic EL device 21, the pixel circuit 20 also has driving components including the device driving transistor 22 mentioned above, a signal writing transistor 23, a signal storage capacitor 24 and a supplementary capacitor 25. In the typical configuration of the pixel circuit 20, each of the device driving transistor 22 and the signal writing transistor 23 is an N-channel TFT. However, conduction types of the device driving transistor 22 and the signal writing transistor 23 are by no means limited to the N-channel conduction type. That is to say, the conduction types of the device driving transistor 22 and the signal writing transistor 23 can each be another conduction type or can be conduction types different from each other.

It is to be noted that, if an N-channel TFT is used as each of the device driving transistor 22 and the signal writing transistor 23, an amorphous silicon (a-Si) process can be applied to the fabrication of the pixel circuit 20. By applying the amorphous silicon (a-Si) process to the fabrication of the pixel circuit 20, it is possible to reduce the cost of a substrate on which the TFTs are created and, hence, reduce the cost of the active-matrix organic EL display apparatus 10 itself. In addition, if the device driving transistor 22 and the signal writing transistor 23 have the same conduction type, the same process can be used for creating the device driving transistor 22 and the signal writing transistor 23. Thus, the same conduction type of the device driving transistor 22 and the signal writing transistor 23 contributes to the cost reduction.

One of the electrodes (that is, either the source or drain electrode) of the device driving transistor 22 is connected to the anode electrode of the organic EL device 21 whereas the other electrode (that is, either the drain or source electrode) of the device driving transistor 22 is connected to the power-supply line 32, that is, one of the power-supply lines 32-1 to 32-*m*.

The gate electrode of the signal writing transistor 23 is connected to the scan line 31, that is, one of the scan lines 31-1 to 31-*m*. One of the electrodes (that is, either the source or drain electrode) of the signal writing transistor 23 is connected to the signal line 33, that is, one of the signal lines 33-1 to 33-*n*, whereas the other electrode (that is, either the drain or source electrode) of the signal writing transistor 23 is connected to the gate electrode of the device driving transistor 22.

In the device driving transistor 22 and the signal writing transistor 23, one of the electrodes is a metallic wire connected to the source or drain electrode whereas the other electrode is a metallic wire connected to the drain or source electrode. In addition, in accordance with a relation between an electric potential appearing on one of the electrodes and an electric potential appearing on the other electrode, one of the electrodes becomes a source or drain electrode whereas the other electrode becomes the drain or source electrode.

One of the electrodes of the signal storage capacitor 24 is connected to the gate electrode of the device driving transistor 22 and the other electrode of the signal writing transistor 23 whereas the other electrode of the signal storage capacitor 24 is connected to one of the electrodes of the device driving transistor 22 and the anode electrode of the organic EL device 21.

One of the electrodes of the supplementary capacitor 25 is connected to the anode electrode of the organic EL device 21, one of the electrodes of the device driving transistor 22 and the other electrode of the signal storage capacitor 24 whereas the other electrode of the supplementary capacitor 25 is connected to the common power-supply line 34 and the cathode electrode of the organic EL device 21. The supplementary capacitor 25 is a capacitor for correcting the organic EL device 21 for an insufficiency of the capacitance of the organic EL device 21 and installed if necessary as a capacitor for increasing a write gain in an operation to store a video signal into the signal storage capacitor 24. That is to say, the supplementary capacitor 25 is not a capacitor required absolutely. If the capacitance of the organic EL device 21 is sufficiently large, the supplementary capacitor 25 can be eliminated.

In the above typical configuration of the pixel circuit 20, the other electrode of the supplementary capacitor 25 is connected to the common power-supply line 34. However, the other electrode of the supplementary capacitor 25 does not have to be connected to the common power-supply line 34. That is to say, the other electrode of the supplementary capacitor 25 can be connected to another node having a fixed electric potential in order to achieve the desired objects to correct the organic EL device 21 for an insufficiency of the capacitance of the organic EL device 21 and increase a write gain in an operation to store a video signal into the signal storage capacitor 24.

In the pixel circuit 20 having the configuration described above, the signal writing transistor 23 is put in a conductive state by a high-level scan signal WS applied by the write scan circuit 40 to the gate electrode of the signal writing transistor 23 through the scan line 31, that is, one of the scan lines 31-1 to 31-*m*. In this conductive state of the signal writing transistor 23, the signal writing transistor 23 samples the video-signal voltage Vsig supplied by the signal outputting circuit 60 through the signal line 33 (that is, one of the signal lines 33-1 to 33-*n*) as a voltage having a magnitude representing luminance information or samples the reference electric potential Vofs also supplied by the signal outputting circuit 60 through the signal line 33 and writes the sampled video-signal voltage Vsig or reference electric potential Vofs into the pixel circuit 20. The sampled video-signal voltage Vsig or reference electric potential Vofs is applied to the gate electrode of the device driving transistor 22 and stored in the signal storage capacitor 24.

With the first power-supply electric potential Vccp asserted on the power-supply line 32 (that is, one of the power-supply lines 32-1 to 32-*m*) as the electric potential DS, one of the electrodes of the device driving transistor 22 becomes the drain electrode whereas the other electrode of the device driving transistor 22 becomes the source electrode. In the electrodes of the device driving transistor 22 functioning in this way, the device driving transistor 22 is operating in a saturated region and flowing a current received from the power-supply line 32 to the organic EL device 21 as a current for driving the organic EL device 21 into a state of emitting light. To put it more concretely, the device driving transistor 22 is operating in a saturated region to supply a driving current serving as a light emission current having a magnitude according to the magnitude of the video-signal voltage Vsig stored in the signal storage capacitor 24 to the organic EL device 21. The organic EL device 21 thus emits light with a luminance according to the magnitude of the driving current in a light emission state.

When the first power-supply electric potential Vccp asserted on the power-supply line 32 (that is, one of the power-supply lines 32-1 to 32-*m*) as the electric potential DS is changed to the second power-supply electric potential Vini, the device driving transistor 22 operates as a switching transistor. When operating as a switching transistor, one of the electrodes of the device driving transistor 22 becomes the source electrode whereas the other electrode of the device driving transistor 22 becomes the drain electrode. As such a switching transistor, the device driving transistor 22 stops the operation to supply the driving current to the organic EL device 21, putting the organic EL device 21 in a no-light emission state. That is to say, the device driving transistor 22 also has a function of a transistor for controlling the light emission and no-light emission states of the organic EL device 21.

The device driving transistor 22 carries out a switching operation in order to set a no-light emission period for the organic EL device 21 as the period of a no-light emission state and control a duty which is defined as a ratio of the light emission period of the organic EL device 21 to the no-light emission period of the organic EL device 21. By executing such control, it is possible to reduce the amount of blurring caused by a residual image attributed to light generated by pixel circuits throughout one frame. Thus, in particular, the quality of a moving image can be made more excellent.

Pixel Structure

Figure 3:
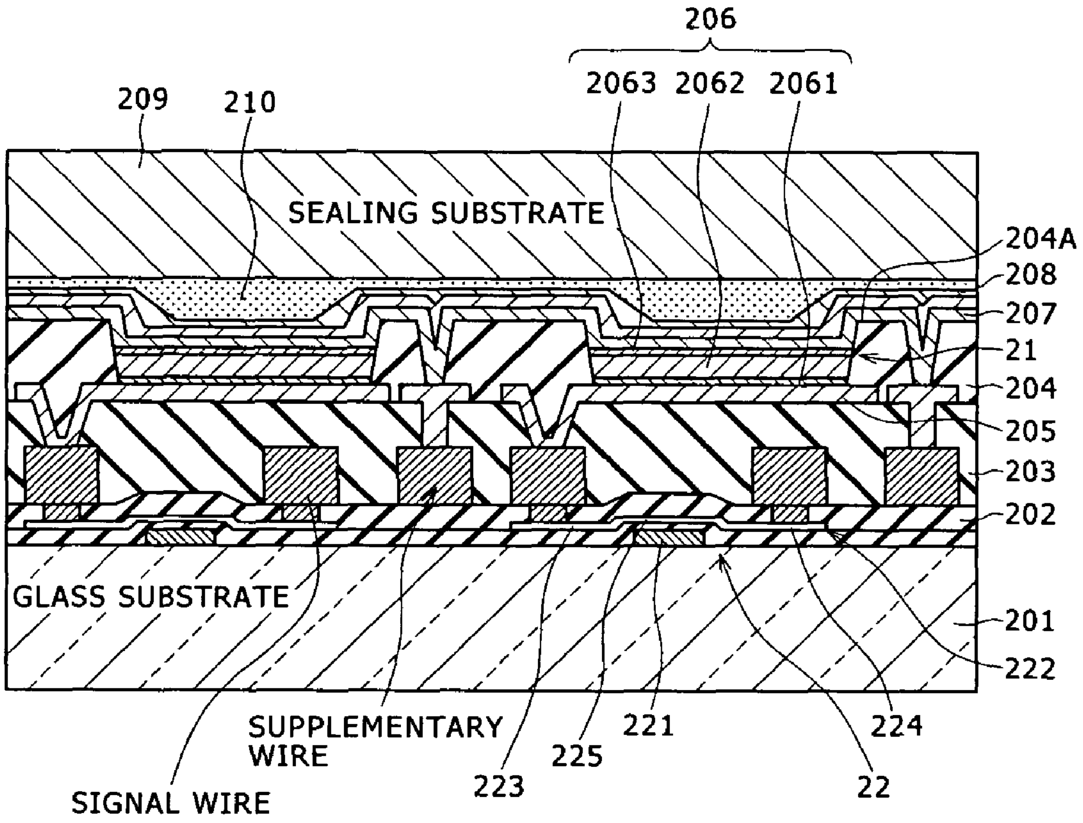
FIG. 3 is a cross-sectional diagram showing the cross section of a typical structure of the pixel circuit.

FIG. 3 is a cross-sectional diagram showing the cross section of a typical structure of the pixel circuit 20. As shown in the cross-sectional diagram of FIG. 3, the structure of the pixel circuit 20 includes a glass substrate 201 over which driving components including the device driving transistor 22 are created. In addition, the structure of the pixel circuit 20 also includes an insulation film 202, an insulation flat film 203 and a window insulation film 204, which are sequentially created on the glass substrate 201 in an order the insulation film 202, the insulation flat film 203 and the window insulation film 204 are enumerated in this sentence. In this structure, the organic EL device 21 is provided on a dent 204A of the window insulation film 204. The cross-sectional diagram of FIG. 3 shows only the device driving transistor 22 of the driving components as a configuration element, omitting the other driving components.

The organic EL device 21 has a configuration including an anode electrode 205, organic layers 206 and a cathode electrode 207. The anode electrode 205 is typically a metal created on the bottom of the dent 204A of the window insulation film 204. The organic layers 206 are an electron transport layer, a light emission layer and a hole transport/injection layer, which are created over the anode electrode 205. Placed on the organic layers 206, the cathode electrode 207 is typically a transparent conductive film created as a film common to all pixel circuits 20.

The organic layers 206 included in the organic EL device 21 are created by sequentially stacking a hole transport layer/hole injection layer 2061, a light emitting layer 2062, an electron transport layer 2063 and an electron injection layer on the anode electrode 205. It is to be noted that the electron injection layer is not shown in the diagram of FIG. 3. In an operation carried out by the device driving transistor 22 to drive the organic EL device 21 to emit light by flowing a current to the organic EL device 21 as shown in the diagram of FIG. 2, the current flows from the device driving transistor 22 to the organic layers 206 by way of the anode electrode 205. With the current flowing to the organic layers 206, holes and electrons are recombined with each other in the light emitting layer 2062, causing light to be emitted.

The device driving transistor 22 is created to have a configuration including a gate electrode 221, a semiconductor layer 222, a source/drain area 223, a drain/source area 224 and a channel creation area 225. In this configuration, the source/drain area 223 is created on one of the sides of the semiconductor layer 222 whereas the drain/source area 224 is created on the other side of the semiconductor layer 222 and the channel creation area 225 faces the gate electrode 221 of the semiconductor layer 222. The source/drain area 223 is electrically connected to the anode electrode 205 of the organic EL device 21 through a contact hole.

As shown in the diagram of FIG. 3, for every pixel circuit 20, an organic EL device 21 is created over the glass substrate 201, sandwiching the insulation film 202, the insulation flat film 203 and the window insulation film 204 between the organic EL device 21 and the glass substrate 201 on which the driving components including the device driving transistor 22 are formed. After organic EL devices 21 are created in this way, a passivation film 208 is created over the organic EL devices 21 and covered by a sealing substrate 209, sandwiching an adhesive 210 between the sealing substrate 209 and the passivation film 208. In this way, the organic EL devices 21 are sealed by the sealing substrate 209, forming a display panel 70.

Basic Circuit Operations of the Organic EL Display Apparatus

Figure 4:
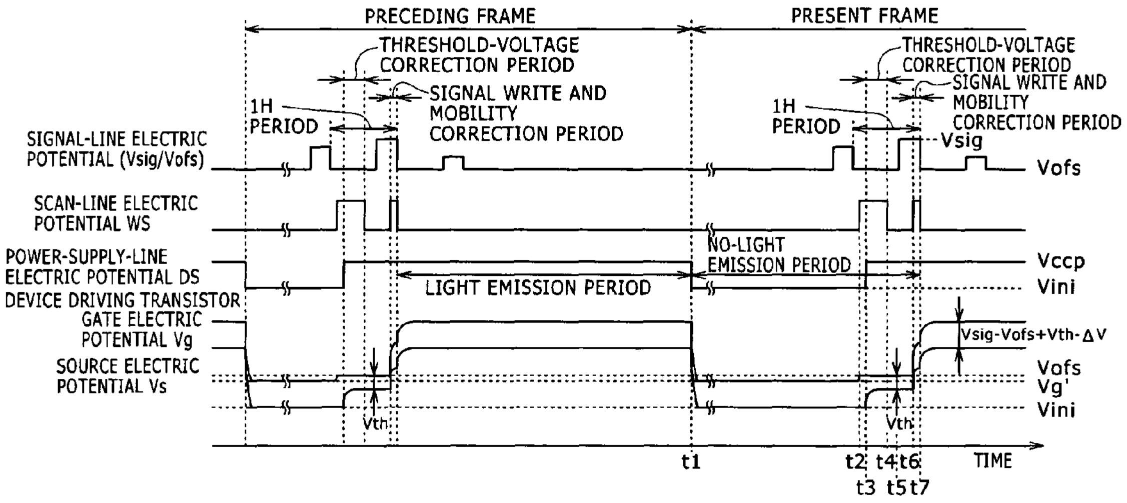
FIG. 4 is an explanatory timing/waveform diagram to be referred to in description of basic circuit operations carried out by the organic EL display apparatus to which the embodiment of the present invention is applied.

Next, by referring to a timing/waveform diagram of FIG. 4 as a base as well as circuit diagrams of FIGS. 5 and 6, the following description explains basic circuit operations carried out by the active-matrix organic EL display apparatus 10 employing pixel circuits 20 laid out two-dimensionally to form a matrix.

It is to be noted that in the circuit-operation explanatory diagrams of FIGS. 5 and 6, the signal writing transistor 23 is shown as a symbol, which represents a switch, in order to make the diagrams simple. In addition, a compound capacitor Csub is shown in each of the circuit-operation explanatory diagrams of FIGS. 5 and 6 as a capacitor having a compound capacitance equal to the sum of the capacitances of the organic EL device 21 and the supplementary capacitor 25 which are connected to each other to form a parallel circuit.

The timing/waveform diagram of FIG. 4 shows variations of an electric potential (a scan signal) WS appearing on the scan line 31 (any one of the scan lines 31-1 to 31-*m*), variations of an electric potential DS appearing on the power-supply line 32 (any one of the power-supply lines 32-1 to 32-*m*), variations of a gate electric potential Vg appearing on the gate electrode of the device driving transistor 22 and variations of a source electric potential Vs appearing on the source electrode of the device driving transistor 22.

Light Emission Period of the Preceding Frame

In the timing/waveform diagram of FIG. 4, a period prior to a time t1 is a light emission period of the organic EL device 21 in an immediately preceding frame. In a light emission period, the electric potential DS appearing on the power-supply line 32 is the first power-supply electric potential Vccp also referred to hereafter as a high electric potential and the signal writing transistor 23 is in a non-conductive state.

With the first power-supply electric potential Vccp asserted on the power-supply line 32 and applied to the device driving transistor 22, the device driving transistor 22 is set to operate in a saturated region. Thus, in the light emission period, a driving current (that is, a light emission current or a drain-source current Ids flowing between the drain and source electrodes of the device driving transistor 22) according to the gate-source voltage Vgs applied between the gate and source electrodes of the device driving transistor 22 flows from the power-supply line 32 to the organic EL device 21 by way of the device driving transistor 22 as shown in the circuit diagram of FIG. 5A. As a result, the organic EL device 21 emits light having a luminance proportional to the magnitude of the driving current Ids.

Threshold-Voltage Correction Preparation Period

Then, at the time t1, a new frame (referred to as a present frame in the timing/waveform diagram of FIG. 4) of the line-by-line sequential scan operation arrives. As shown in the circuit diagram of FIG. 5B, the electric potential DS appearing on the power-supply line 32 is changed from the high electric potential Vccp to the second power-supply electric potential Vini. Also referred to hereafter as a low electric potential, typically, the low electric potential Vini is sufficiently lower than (Vofs−Vth).

Let us assume that the low electric potential Vini satisfies the relation Vini<(Vel+Vcath) where notation Vel denotes the threshold voltage of the organic EL device 21 whereas notation Vcath denotes an electric potential appearing on the common power-supply line 34. In this case, since a source electric potential Vs appearing on the source electrode of the device driving transistor 22 is about equal to the low electric potential Vini, the organic EL device 21 is put in a reversed-bias state, ceasing to emit light.

Figure 5A:
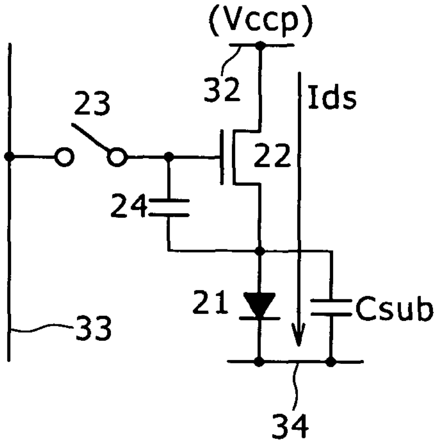
FIGS. 5A to 6D are a plurality of explanatory diagrams to be referred to in description of the basic circuit operations.
Figure 5B:
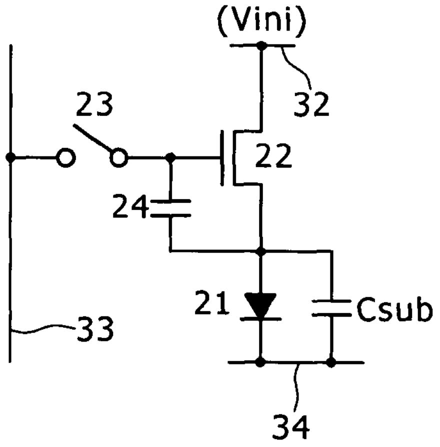
Figure 5C:
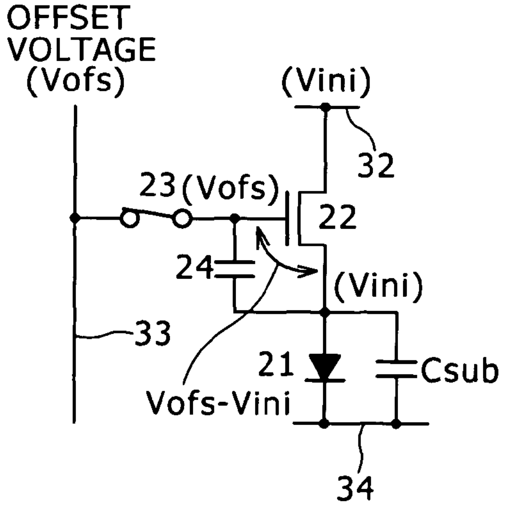

Then, at a later time t2, the electric potential WS appearing on the scan line 31 is changed from a low level to a high level, putting the signal writing transistor 23 in a conductive state as shown in the circuit diagram of FIG. 5C. In this state, the signal outputting circuit 60 asserts the reference electric potential Vofs on the signal line 33 and the reference electric potential Vofs is applied to the gate electrode of the device driving transistor 22 as the gate electric potential Vg by way of the signal writing transistor 23. As described above, the low electric potential Vini sufficiently lower than the reference electric potential Vofs is supplied to the source electrode of the device driving transistor 22 as the source electric potential Vs at that time.

Thus, at that time, the gate-source voltage Vgs applied between the gate and source electrodes of the device driving transistor 22 is equal to an electric-potential difference of (Vofs−Vini). If the electric-potential difference of (Vofs−Vini) is not greater than the threshold voltage Vth of the device driving transistor 22, the threshold-voltage correction process to be described later cannot be carried out. It is thus necessary to set the electric-potential relation (Vofs−Vini)>Vth.

The initialization process to fix (set) the gate electric potential Vg appearing on the gate electrode of the device driving transistor 22 at the reference electric potential Vofs and the source electric potential Vs appearing on the source electrode of device driving transistor 22 at the low electric potential Vini is a preparation for the threshold-voltage correction process to be described later. In the following description, the preparation for the threshold-voltage correction process is referred to as a threshold-voltage correction preparation process. In this preparation for the threshold-voltage correction process, the reference electric potential Vofs is an initialization electric potential of the gate electric potential Vg appearing on the gate electrode of the device driving transistor 22 whereas the low electric potential Vini is an initialization electric potential of the source electric potential Vs appearing on the source electrode of the device driving transistor 22.

Threshold-Voltage Correction Period

Figure 5D:
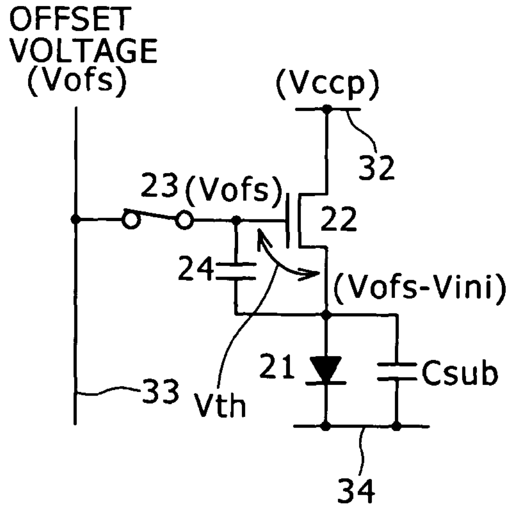

Then, at a later time t3, when the electric potential DS appearing on the power-supply line 32 is changed from the low electric potential Vini to the high electric potential Vccp as shown in the circuit diagram of FIG. 5D, in a state of sustaining the gate electric potential Vg appearing on the gate electrode of the device driving transistor 22 as it is, the source electric potential Vs appearing on the source electrode of the device driving transistor 22 starts to rise toward an electric potential obtained as result of subtracting the threshold voltage Vth of the device driving transistor 22 from the gate electric potential Vg. In due course of time, the voltage Vgs applied between the gate and source electrodes of the device driving transistor 22 is converged to the threshold voltage Vth of the device driving transistor 22, causing a voltage corresponding to the threshold voltage Vth to be stored in the signal storage capacitor 24.

For the sake of convenience, the reference electric potential Vofs serving as an initialization electric potential of the gate electric potential Vg appearing on the gate electrode of the device driving transistor 22 as described above is taken as a reference electric potential. Thus, in a state of sustaining the gate electric potential Vg appearing on the gate electrode of the device driving transistor 22 as it is, the source electric potential Vs appearing on the source electrode of the device driving transistor 22 starts to change (or, to put it concretely, starts to rise) toward an electric potential obtained as result of subtracting the threshold voltage Vth of the device driving transistor 22 from the initialization electric potential Vofs. Then, a finally converged voltage Vgs appearing between the gate and source electrodes of the device driving transistor 22 is detected as the threshold voltage Vth of the device driving transistor 22 and a voltage corresponding to the threshold voltage Vth is stored in the signal storage capacitor 24. The process of raising the source electric potential Vs and the process of detecting a finally converged voltage Vgs as the threshold voltage Vth as well as storing the detected voltage Vgs in the signal storage capacitor 24 as described above are referred to as a threshold-voltage correction process. The time period within which the threshold-voltage correction process is carried out is referred to as a threshold-voltage correction period.

It is to be noted that, in the threshold-voltage correction period, in order to flow the entire driving current to the signal storage capacitor 24 instead of flowing to the organic EL device 21, the common power-supply line 34 is set at the electric potential Vcath in advance so as to put the organic EL device 21 in a cut-off state.

Figure 6A:
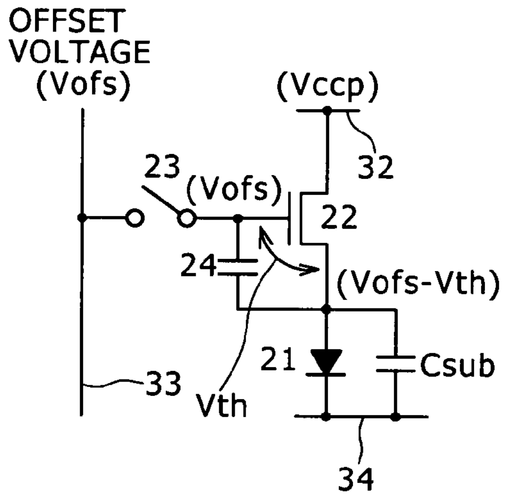

Then, at a later time t4, the electric potential WS appearing on the scan line 31 is changed to a low level in order to put the signal writing transistor 23 in a non-conductive state as shown in the circuit diagram of FIG. 6A. In this non-conductive state of the signal writing transistor 23, the gate electrode of the device driving transistor 22 is electrically disconnected from the signal line 33, entering a floating state. Since the voltage Vgs appearing between the gate and source electrodes of the device driving transistor 22 is equal to the threshold voltage Vth of the device driving transistor 22, however, the device driving transistor 22 is put in a cut-off state. Thus, the drain-source current Ids does not flow through the device driving transistor 22.

Write and Mobility Correction Periods

Figure 6B:
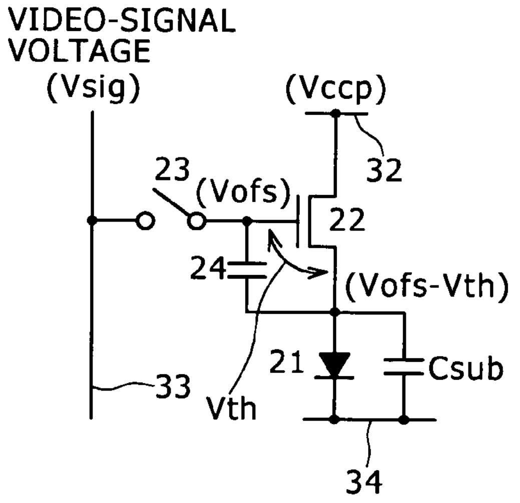
Figure 6C:
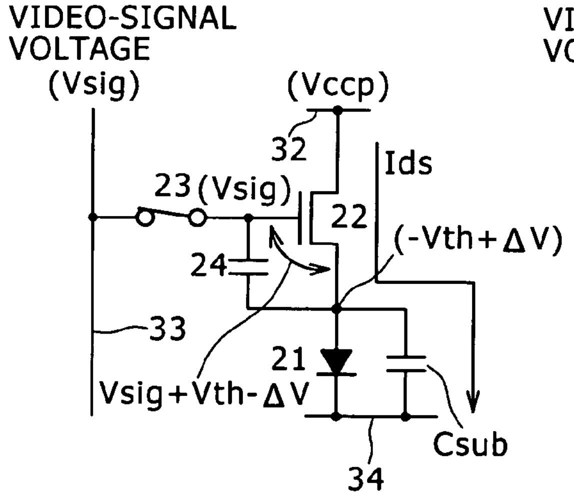

Then, at a later time t5, the electric potential appearing on the signal line 33 is changed from the reference electric potential Vofs to the video-signal voltage Vsig as shown in the circuit diagram of FIG. 6B in order to prepare for a signal writing operation and a mobility correction process. Subsequently, at a later time t6 of the start of the signal write and mobility correction periods, by setting the electric potential WS appearing on the scan line 31 at a high level, the signal writing transistor 23 is put in a conductive state as shown in the circuit diagram of FIG. 6C. In this state, the signal writing transistor 23 samples the video-signal voltage Vsig and stores the sampled video-signal voltage Vsig into the pixel circuit 20.

As a result of the operation carried out by the signal writing transistor 23 to store the sampled video-signal voltage Vsig into the pixel circuit 20, the gate electric potential Vg appearing on the gate electrode of the device driving transistor 22 becomes equal to the video-signal voltage Vsig. In the operation to drive the device driving transistor 22 by making use of the video-signal voltage Vsig, the threshold voltage Vth of the device driving transistor 22 and a voltage stored in the signal storage capacitor 24 as a voltage corresponding to the threshold voltage Vth kill each other in the so-called threshold-voltage correction process, the principle of which will be described later in detail.

At that time, the organic EL device 21 is initially in a cut-off state (or a high-impedance state). Thus, the drain-source current Ids flowing from the power-supply line 32 to the device driving transistor 22 driven by the video-signal voltage Vsig actually goes to the aforementioned compound apparent capacitor Csub connected in parallel to the organic EL device 21 instead of entering the organic EL device 21 itself. As a result, an electric charging process of the apparent capacitor with the compound capacitor Csub is started.

While the apparent capacitor with the compound capacitor Csub is being electrically charged, the source electric potential Vs appearing on the source electrode of the device driving transistor 22 rises with the lapse of time. Since the drain-source current Ids flowing between the drain and source electrodes of the device driving transistor 22 has already been corrected for the Vth (threshold-voltage) variations from pixel to pixel, the drain-source current Ids varies from pixel to pixel only in accordance with the mobility μ of the device driving transistor 22.

Let us assume that the write gain has an ideal value of 1. The write gain is defined as a ratio of the voltage Vgs observed between the gate and source electrodes of the device driving transistor 22 and stored in the signal storage capacitor 24 as a voltage corresponding to the threshold voltage Vth of the device driving transistor 22 as described above to the video-signal voltage Vsig. As the source electric potential Vs appearing on the source electrode of the device driving transistor 22 reaches an electric potential of (Vofs−Vth+ΔV), the voltage Vgs observed between the gate and source electrodes of the device driving transistor 22 becomes equal to an electric potential of (Vsig−Vofs+Vth−ΔV) where notation ΔV denotes the increase in source electric potential Vs.

That is to say, a negative feedback operation is carried out so as to subtract the increase ΔV of the source electric potential Vs appearing on the source electrode of the device driving transistor 22 from a voltage stored in the signal storage capacitor 24 as a voltage of (Vsig−Vofs+Vth) or, in other words, a negative feedback operation is carried out so as to electrically discharge some electric charge from the signal storage capacitor 24. In the negative feedback operation, the increase ΔV of the source electric potential Vs appearing on the source electrode of the device driving transistor 22 is used as a negative-feedback quantity.

As described above, by negatively feeding the drain-source current Ids flowing between the drain and source electrodes of the device driving transistor 22 back to the gate input of the device driving transistor 22, that is, by negatively feeding the drain-source current Ids flowing between the drain and source electrodes of the device driving transistor 22 back to the voltage Vgs appearing between the gate and source electrodes of the device driving transistor 22, the dependence of the drain-source current Ids on the mobility μ of the device driving transistor 22 can be eliminated. That is to say, in the operation to sample the video-signal voltage Vsig and store the sampled video-signal voltage Vsig into the pixel circuit 20, a mobility correction process is also carried out as well in order to correct the drain-source current Ids flowing between the drain and source electrodes of the device driving transistor 22 for mobility-p variations from pixel to pixel.

To put it more concretely, the higher the video-signal voltage Vsig stored in the pixel circuit 20, the bigger the drain-source current Ids flowing between the drain and source electrodes of the device driving transistor 22 and, hence, the larger the absolute value of the increase ΔV used as the negative-feedback quantity (or the correction quantity). Thus, it is possible to carry out a mobility correction process according to the level of the luminance of light emitted by the organic EL device 21.

For a fixed video-signal voltage Vsig, the larger the mobility μ of the device driving transistor 22, the bigger the absolute value of the increase ΔV used as the negative-feedback quantity (or the correction quantity). It is thus possible to correct the drain-source current Ids flowing between the drain and source electrodes of the device driving transistor 22 for mobility (μ) variations from pixel to pixel. The principle of the mobility correction process will be described later in detail.

Light Emission Period

Figure 6D:
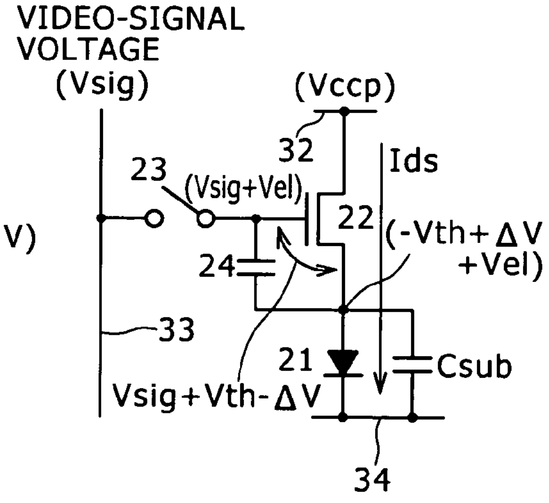

Then, at a later time t7, the electric potential WS appearing on the scan line 31 is changed to a low level in order to put the signal writing transistor 23 in a non-conductive state as shown in the circuit diagram of FIG. 6D. With the electric potential WS put at a low level, the gate electrode of the device driving transistor 22 is electrically disconnected from the signal line 33, entering a floating state.

With the gate electrode of the device driving transistor 22 put in a floating state and the gate as well as source electrodes of the device driving transistor 22 connected to the signal storage capacitor 24, when the source electric potential Vs appearing on the source electrode of the device driving transistor 22 varies in accordance with the amount of electrical charge stored in the signal storage capacitor 24, the gate electric potential Vg appearing on the gate electrode of the device driving transistor 22 also varies in a manner of being interlocked with the variation of the source electric potential Vs. The operation in which the gate electric potential Vg appearing on the gate electrode of the device driving transistor 22 also varies in a manner of being interlocked with the variation of the source electric potential Vs appearing on the source electrode of the device driving transistor 22 is referred to as a bootstrap operation of the signal storage capacitor 24.

With the gate electrode of the device driving transistor 22 put in a floating state, as the drain-source current Ids flowing between the drain and source electrodes of the device driving transistor 22 starts to flow to the organic EL device 21, an electric potential appearing on the anode electrode of the organic EL device 21 rises in accordance with the increase of the drain-source current Ids.

As the electric potential appearing on the anode electrode of the organic EL device 21 exceeds an electric potential of (Vel+Vcath), a driving current (or a light emission current) starts to flow through the organic EL device 21, causing the organic EL device 21 to begin emitting light. The increase of the electric potential appearing on the anode electrode of the organic EL device 21 is no other than the increase of the source electric potential Vs appearing on the source electrode of the device driving transistor 22. When the source electric potential Vs appearing on the source electrode of the device driving transistor 22 rises, due to the effect of the bootstrap operation of the signal storage capacitor 24, the gate electric potential Vg appearing on the gate electrode of the device driving transistor 22 also rises in a manner of being interlocked with the variation of the source electric potential Vs appearing on the source electrode of the device driving transistor 22.

Let us assume that a bootstrap gain has an ideal value of 1 in the bootstrap operation. In this case, the increase of the gate electric potential Vg appearing on the gate electrode of the device driving transistor 22 is equal to the increase of the source electric potential Vs appearing on the source electrode of the device driving transistor 22. Therefore, during a light emission period, the gate-source voltage Vgs applied between the gate and source electrodes of the device driving transistor 22 is sustained at a fixed level of (Vsig−Vofs+Vth−ΔV).

Principle of the Threshold-Voltage Correction Process

The following description explains the principle of the threshold-voltage correction process. As described before, the device driving transistor 22 is designed to operate in a saturated region. Thus, the device driving transistor 22 works as a constant-current source. As a result, the device driving transistor 22 supplies a constant drain-source current Ids (also referred to as a driving current or a light emission current) given by Eq. (1) to the organic EL device 21.

$$Ids=(1/2)*\mu(W/L)Cox(Vgs-Vth)^2 \qquad (1)$$

In the above equation, notation W denotes the width of the channel of the device driving transistor 22, notation L denotes the length of the channel, notation Cox denotes a gate capacitance per unit area.

Figure 7:
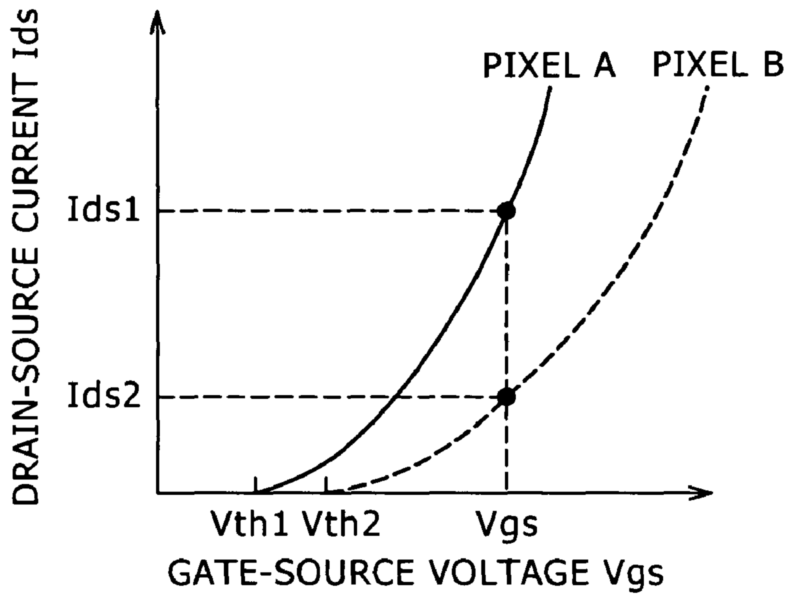
FIG. 7 is a characteristic diagram showing curves used for explaining variations in threshold voltage Vth of a device driving transistor from transistor to transistor.

FIG. 7 is a characteristic diagram showing curves each representing a current-voltage characteristic expressing a relation between the drain-source current Ids flowing between the drain and source electrodes of the device driving transistor 22 and the gate-source voltage Vgs applied between the gate and source electrodes of the device driving transistor 22.

A solid line in the characteristic diagram of FIG. 7 represents a characteristic for pixel circuit A having a device driving transistor 22 with a threshold voltage Vth1 whereas a dashed line in the same characteristic diagram represents a characteristic for pixel circuit B having a device driving transistor 22 with a threshold voltage Vth2 different from the threshold voltage Vth1.

In the example shown in the characteristic diagram of FIG. 7, the threshold voltage Vth2 of the device driving transistor 22 employed in pixel circuit B is greater than the threshold voltage Vth1 of the device driving transistor 22 employed in pixel circuit A, that is, Vth2>Vth1. In this case, for the same gate-source voltage Vgs on the horizontal axis, the drain-source current Ids flowing between the drain and source electrodes of the device driving transistor 22 employed in pixel circuit A is Ids1 whereas the drain-source current Ids flowing between the drain and source electrodes of the device driving transistor 22 employed in pixel circuit B is Ids2 which smaller than the drain-source current Ids1, that is, Ids2<Ids1. That is to say, even for the same gate-source voltage Vgs on the horizontal axis, if the threshold voltage Vth of the device driving transistor 22 varies from pixel to pixel, unless a threshold-voltage correction process is carried out to correct the drain-source current Ids for variations in Vth from pixel to pixel where notation Vth denotes the threshold voltage of the device driving transistor 22, the drain-source current Ids flowing between the drain and source electrodes of the drain-source current also varies from pixel to pixel as well.

In the pixel circuit 20 having the configuration described above, on the other hand, the gate-source voltage Vgs applied between the gate and source electrodes of the device driving transistor 22 at a light emission time is equal to (Vsig−Vofs+Vth−ΔV) as described before. By substituting the expression (Vsig−Vofs+Vth−ΔV) into Eq. (1) for Vgs, the drain-source current Ids can be expressed by Eq. (2) as follows:

$$Ids=(1/2)*\mu(W/L)Cox(VSig-Vofs-\Delta V)^2 \qquad (2)$$

That is to say, the term Vth representing the threshold voltage of the device driving transistor 22 is cancelled. In other words, the drain-source current Ids flowing from the device driving transistor 22 to the organic EL device 21 is no longer dependent on the threshold voltage Vth of the device driving transistor 22. As a result, even if the threshold voltage Vth of the device driving transistor 22 varies from pixel to pixel due to variations in process of manufacturing the device driving transistor 22 or due to the time degradation, the drain-source current Ids does not vary from pixel to pixel. Thus, it is possible to sustain the luminance of light emitted by each of organic EL devices 21 if the same gate-source voltage Vgs representing the same video-signal voltage Vsig is applied to the gate electrodes of the device driving transistors 22 employed in the pixel circuits each including one of the organic EL devices 21.

Principle of the Mobility Correction Process

Figure 8:
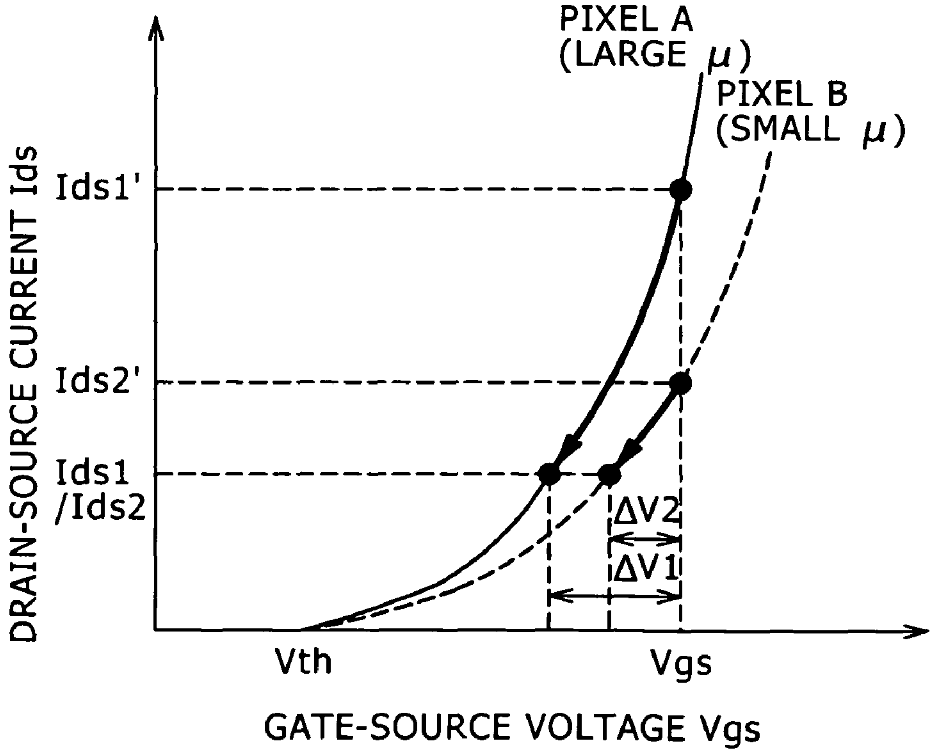
FIG. 8 is a characteristic diagram showing curves used for explaining variations in mobility μ of a device driving transistor from transistor to transistor.

The following description explains the principle of the mobility correction process. FIG. 8 is also a characteristic diagram showing curves each representing a current-voltage characteristic expressing a relation between the drain-source current Ids flowing between the drain and source electrodes of the device driving transistor 22 and the gate-source voltage Vgs applied between the gate and source electrodes of the device driving transistor 22. A solid line in the characteristic diagram of FIG. 8 represents a characteristic for pixel circuit A having a device driving transistor 22 with a relatively large mobility μ whereas a dashed line in the same characteristic diagram represents a characteristic for pixel circuit B having a device driving transistor 22 with a relatively small mobility μ. If a poly-silicon thin film transistor or the like is employed in the pixel circuit 20 as the device driving transistor 22, variations in mobility μ from pixel to pixel such as the differences in mobility μ between pixel circuits A and B cannot be avoided.

With the existing differences in mobility μ between pixel circuits A and B, even if the same gate-source voltage Vgs representing the same video-signal voltage Vsig is applied to the gate electrodes of the device driving transistors 22 employed in pixel circuit A employing a device driving transistor 22 with a relatively large mobility μ and pixel circuit B employing a device driving transistor 22 with a relatively small mobility μ, the drain-source current Ids flowing between the drain and source electrodes of the device driving transistor 22 employed in pixel circuit A is Ids1' whereas the drain-source current Ids flowing between the drain and source electrodes of the device driving transistor 22 employed in pixel circuit B is Ids2' much different from the drain-source current Ids1' unless a mobility correction process is carried out to correct the drain-source current Ids flowing between the drain and source electrodes of the device driving transistor 22 for the differences in mobility μ between pixel circuits A and B. If such a large Ids difference is caused by variations in U from pixel to pixel as a difference in drain-source current Ids between the device driving transistors 22 where notation p denotes the mobility of the device driving transistor 22, the uniformity of the screen is lost.

As is obvious from Eq. (1) given earlier as an equation expressing the characteristic of the device driving transistor 22, the larger the mobility μ of a device driving transistor 22, the larger the drain-source current Ids flowing between the drain and source electrodes of the device driving transistor 22. Thus, the larger the mobility μ of a device driving transistor 22, the larger the feedback quantity ΔV of the negative feedback operation. As shown in the characteristic diagram of FIG. 8, the feedback quantity ΔV1 of pixel circuit A employing a device driving transistor 22 with a relatively large mobility μ is greater than the feedback quantity ΔV2 of pixel circuit B employing a device driving transistor 22 with a relatively small mobility μ.

The mobility correction process is carried out by negatively feeding the drain-source current Ids flowing between the drain and source electrodes of the device driving transistor 22 back to the Vsig side where notation Vsig denotes the voltage of the video signal. In this negative feedback operation, the larger the mobility p of a device driving transistor 22, the higher the degree at which the negative feedback operation is carried out. As a result, it is possible to eliminate the variations in u from pixel to pixel where notation u denotes the mobility of the device driving transistor 22.

To put it concretely, if the feedback quantity ΔV1 is taken in the negative feedback operation of the mobility correction process carried out on pixel circuit A employing a device driving transistor 22 with a relatively large mobility μ, the drain-source current Ids flowing between the drain and source electrodes of the device driving transistor 22 employed in pixel circuit A is greatly reduced from Ids1' to Ids1. If the feedback quantity ΔV2 smaller than the feedback quantity ΔV1 is taken in the negative feedback operation of the mobility correction process carried out on pixel circuit B employing a device driving transistor 22 with a relatively small mobility μ, on the other hand, in comparison with pixel circuit A, the drain-source current Ids flowing between the drain and source electrodes of the device driving transistor 22 employed in pixel circuit B is slightly reduced from Ids2' to Ids2 which is all but equal to the drain-source current Ids1. As a result, since Ids1 representing the drain-source current Ids flowing between the drain and source electrodes of the device driving transistor 22 employed in pixel circuit A is all but equal to Ids2 representing the drain-source current Ids flowing between the drain and source electrodes of the device driving transistor 22 employed in pixel circuit B, it is possible to correct the drain-source current Ids flowing between the drain and source electrodes of the device driving transistor 22 for variations of the mobility of the device driving transistor 22 from pixel to pixel.

What is described above is summarized as follows. The feedback quantity ΔV1 taken in the negative feedback operation carried out as the mobility correction process on pixel circuit A employing a device driving transistor 22 with a relatively large mobility μ is large in comparison with the feedback quantity ΔV2 taken in the negative feedback operation of the mobility correction process carried out on pixel circuit B employing a device driving transistor 22 with a relatively small mobility μ. That is to say, the larger the mobility μ of a device driving transistor 22, the larger the feedback quantity ΔV of the negative feedback operation carried out on a pixel circuit employing the device driving transistor 22 and, hence, the larger the decrease in drain-source current Ids flowing between the drain and source electrodes of the device driving transistor 22.

Thus, by negatively feeding the drain-source current Ids flowing between the drain and source electrodes of the device driving transistor 22 back to the gate-electrode side supplied with the video-signal voltage Vsig as the gate-electrode side of the device driving transistor 22, the magnitudes of the drain-source currents Ids following through device driving transistors 22 employed in pixel circuits as device driving transistors 22 having different values of the mobility μ can be averaged. As a result, it is possible to correct the drain-source current Ids flowing between the drain and source electrodes of the device driving transistor 22 for variations of the mobility of the device driving transistor 22 from pixel to pixel. That is to say, the negative-feedback operation of negatively feeding the magnitude of the drain-source current Ids flowing between the drain and source electrodes of the device driving transistor 22 back to the gate-electrode side of the device driving transistor 22 is the mobility correction process.

FIG. 9 is a plurality of diagrams each showing relations between the video-signal voltage Vsig (or the sampling electric potential) and the drain-source current Ids flowing between the drain and source electrodes of the device driving transistor 22 employed in the pixel circuit 20 included in the active-matrix organic EL display apparatus 10 shown in the block diagram of FIG. 2. The diagrams show such relations for a variety of driving methods carried out with or without the threshold-voltage correction process and with or without the mobility correction process.

Figure 9A:
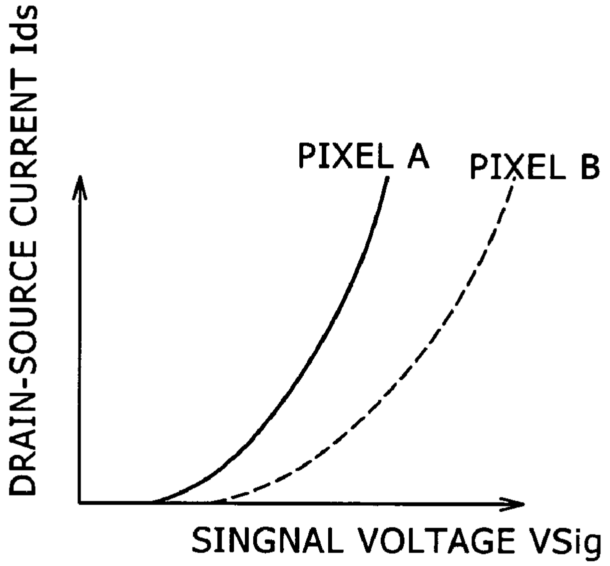
FIGS. 9A to 9C are a plurality of diagrams each showing relations between a video-signal voltage Vsig and a drain-source current Ids flowing between the drain and source electrodes of a device driving transistor for a variety of cases.
Figure 9B:
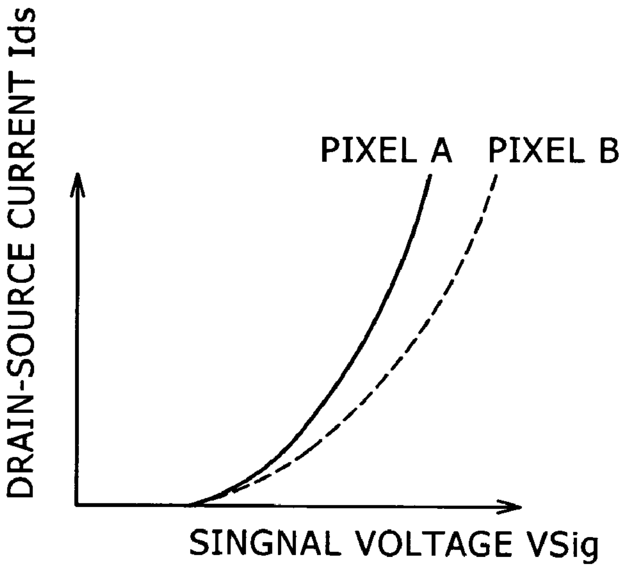
Figure 9C:
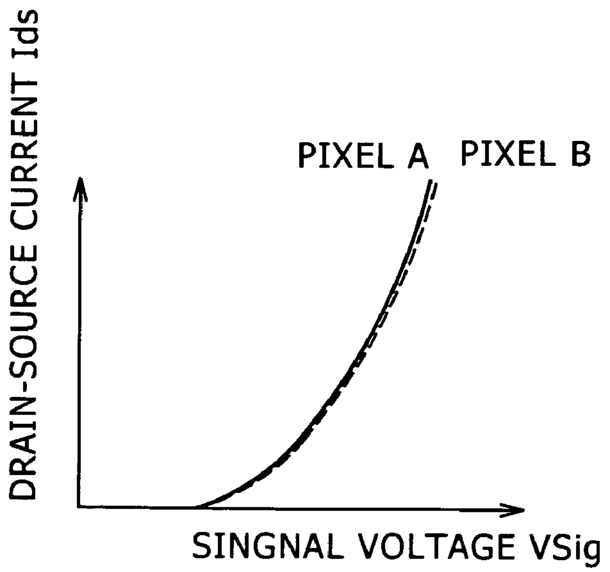

To be more specific, in FIG. 9A, different pixel circuits A and B are subjected to neither the threshold-voltage correction process nor the mobility correction process. In FIG. 9B, different pixel circuits A and B are subjected to the threshold-voltage correction process but not subjected to the mobility correction process. In FIG. 9C, different pixel circuits A and B are subjected to both the threshold-voltage correction process and the mobility correction process. As shown by the curves of FIG. 9A given for a case in which pixel circuits A and B are subjected to neither the threshold-voltage correction process nor the mobility correction process, for the same video-signal voltage Vsig on the horizontal axis, a big difference in drain-source current Ids between pixel circuits A and B having different threshold voltages Vth and different values of the mobility μ is observed as a difference caused by the different threshold voltages Vth and the different values of the mobility μ.

As shown by the curves of FIG. 9B given for a case in which pixel circuits A and B are subjected to the threshold-voltage correction process but not subjected to the mobility correction process, on the other hand, for the same video-signal voltage Vsig on the horizontal axis, a smaller difference in drain-source current Ids between pixel circuits A and B having different threshold voltages Vth and different values of the mobility μ is observed as a difference caused by the different threshold voltages Vth and the different values of the mobility μ. Even though the difference is reduced to a certain degree from the difference for the case shown by the curves of FIG. 9A, the difference caused by the different values of the mobility μ still remains.

As shown by the curves of FIG. 9C given for a case in which pixel circuits A and B are subjected to both the threshold-voltage correction process and the mobility correction process, for the same video-signal voltage Vsig on the horizontal axis, all but no difference in drain-source current Ids between pixel circuits A and B having different threshold voltages Vth and different values of the mobility μ is observed as a difference caused by the different threshold voltages Vth and the different values of the mobility μ. Thus, there are no variations of the luminance of light emitted by the organic EL device 21 from pixel to pixel for every gradation. As a result, it is possible to display an image having a high quality.

In addition, besides the threshold-voltage and mobility correction functions, the pixel circuit 20 included in the active-matrix organic EL display apparatus 10 shown in the block diagram of FIG. 2 also has a bootstrap-operation function of the signal storage capacitor 24 as described previously so that the pixel circuit 20 is capable of exhibiting an effect described as follows.

Even if the source electric potential Vs appearing on the source electrode of the device driving transistor 22 changes because the I-V characteristic of the organic EL device 21 deteriorates with the lapse of time in a time degradation process, the bootstrap operation of the signal storage capacitor 24 allows the gate-source voltage Vgs applied between the gate and source electrodes of the device driving transistor 22 to be sustained at a fixed level so that the current flowing through the organic EL device 21 also does not change with the lapse of time in a time degradation process. Thus, since the luminance of light emitted by the organic EL device 21 also does not vary with the lapse of time in a time degradation process, it is possible to display images with no deteriorations accompanying the time degradation of the I-V characteristic of the organic EL device 21 even if the I-V characteristic worsens with the lapse of time in a time degradation process.

Problems in the Light Emission Period

By the way, during a light emission period, a negative bias voltage such as a voltage of about −3 V is applied to the gate electrode of the signal writing transistor 23 so that the signal writing transistor 23 is in a non-conductive state. In addition, during a light emission period, a current is flowing through the organic EL device 21 so that an electric potential appearing on the anode electrode of the organic EL device 21 rises to a fixed level such as 5 V. The electric potential appearing on the anode electrode of the organic EL device 21 is an electric potential appearing on the source electrode of the device driving transistor 22.

In addition, if a white-gradation video-signal voltage Vsig is set at a typical level of 5 V at a white-gradation display time or the like, the gate electric potential Vg appearing on the gate electrode of the device driving transistor 22 becomes higher than the source electric potential Vs appearing on the source electrode of the device driving transistor 22 by an additional difference of 5 V equal to the typical level, attaining a level of about 10 V which is the sum of the fixed level such of 5 V and the typical level of 5 V. In the mean time, when the particular pixel row of the pixel circuit 20 employing the device driving transistor 22 is in a light emission period, an operation to write a video-signal voltage Vsig is carried out on the other pixel rows. At that time, the electric potential appearing on the source electrode of a signal writing transistor 23 employed in a pixel circuit 20 on another pixel row is set at a level in a range of approximately 0 to 6 V due to the video-signal voltage Vsig asserted on a signal line 33 which is also connected to the source electrode of the signal writing transistor 23 employed in the same pixel circuit 20 on the particular pixel row as the device driving transistor 22.

As a result, since the electric potential appearing on the source electrode of the signal writing transistor 23 is set at a level in a range of approximately 0 to 6 V while a voltage of about −3 V is applied to the gate electrode of the signal writing transistor 23, the voltage of about −3 V applied to the gate electrode is a negative bias voltage and, in addition, a high voltage of about 13 V is applied between the gate and drain of the signal writing transistor 23.

The negative bias voltage causes a phenomenon verified by the inventors of the present invention as a phenomenon in which the threshold voltage Vth of the signal writing transistor 23 changes in a direction toward a lower level. To be more specific, the negative bias voltage applied to the gate electrode of the signal writing transistor 23 in a light emission period as described above shifts the Vth characteristic of the signal writing transistor 23 from a characteristic in an enhancement state to a characteristic in a depletion state. The enhancement state is a state in which a current flows from the source electrode of the signal writing transistor 23 to the drain electrode of the signal writing transistor 23 through a channel created by a write pulse (or a scan pulse) WS applied to the gate electrode of the signal writing transistor 23. On the other hand, the depletion state is a state in which a current is flowing from the source electrode of the signal writing transistor 23 to the drain electrode of the signal writing transistor 23 due to no write pulse applied to the gate electrode of the signal writing transistor 23.

Figure 10:
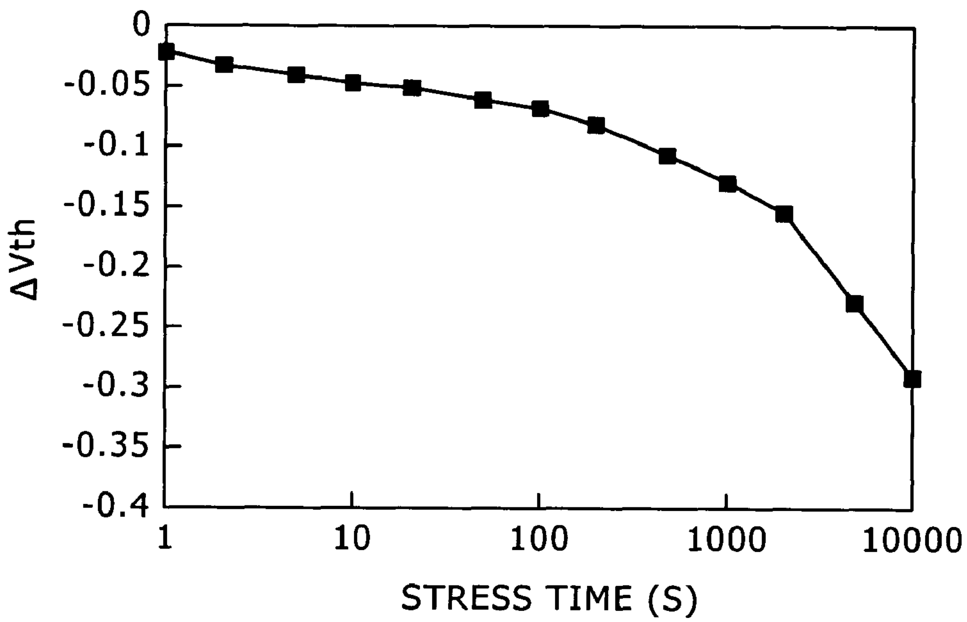
FIG. 10 is a diagram showing a curve representing a typical characteristic of the relation between the threshold voltage Vth of a transistor and the stress time period during which a negative bias voltage is applied to the gate electrode of the transistor.

FIG. 10 is a diagram showing a typical characteristic caused by an applied negative bias voltage as a characteristic representing variations in threshold voltage Vth. In the diagram of FIG. 10, the horizontal axis represents a stress time period during which a negative bias voltage is being applied to the gate electrode of the signal writing transistor 23. On the other hand, the vertical axis represents the change ΔVth in threshold voltage Vth. As is obvious from the characteristic shown in the diagram of FIG. 10, the longer the stress time period, the larger the change ΔVth in threshold voltage Vth, that is, the more the threshold voltage Vth becomes lower.

An optimum correction time of the mobility correction process is expressed as follows:

$$t=C/(k\mu vsig) \qquad (3)$$

In the above equation, notation k denotes a constant which can be expressed as follows:

$$k=(1/2)(W/L)Cox$$

On the other hand, notation C denotes the capacitance of a node discharging electrical charge in the mobility correction process. In the case of the typical active-matrix organic EL display apparatus 10 shown in the block diagram of FIG. 2, the capacitance of a node is the equivalent capacitance of the organic EL device 21 and the compound capacitance of the signal storage capacitor 24 and the supplementary capacitor 25.

In addition, the correction time t of the mobility correction process is determined by a timing by which the signal writing transistor 23 transits from a conductive state to a non-conductive state. The signal writing transistor 23 transits from a conductive state to a non-conductive state, entering a cut-off state when the difference in electric potential between the gate electrode of the signal writing transistor 23 and the signal line 33 connected to the source electrode (that is, between the gate and source electrodes of the signal writing transistor 23) becomes equal to the threshold voltage Vth of the signal writing transistor 23.

By the way, the inventors of the present invention set the correction time t of the mobility correction process at a value inversely proportional to the video-signal voltage Vsig. To put it in detail, when the video-signal voltage Vsig is large, the correction time t of the mobility correction process is set at a small value but, when the video-signal voltage Vsig is small, on the other hand, the correction time t of the mobility correction process is set at a large value. The inventors of the present invention have verified that, by setting the correction time t of the mobility correction process in this way, the dependence of the drain-source current Ids flowing between the drain and source electrodes of the device driving transistor 22 on the mobility μ can be eliminated with a higher degree of reliability. That is to say, the inventors of the present invention have verified that, by setting the correction time t of the mobility correction process in this way, the current Ids flowing between the drain and source electrodes of the device driving transistor 22 can be corrected for variations of the mobility μ from pixel to pixel.

Figure 11:
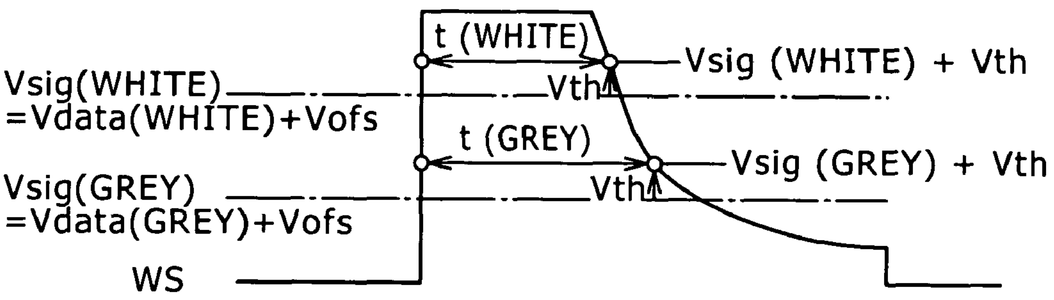
FIG. 11 is a diagram showing the waveform of a write pulse WS having such a falling edge that the correction time t of the mobility correction process is inversely proportional to the magnitude of the video-signal voltage.

In order to set the correction time t of the mobility correction process at values described above, the write pulse WS to be applied to the gate electrode of the signal writing transistor 23 is generated to have a waveform with such a falling edge representing a transition from a high level to a low level that the correction time t of the mobility correction process is inversely proportional to the magnitude of the video-signal voltage Vsig as shown in a diagram of FIG. 11. In the case of a P-channel transistor used as the signal writing transistor 23, however, the write pulse WS to be applied to the gate electrode of the signal writing transistor 23 is generated to have a waveform with such a rising edge representing a transition from a low level to a high level that the correction time t of the mobility correction process is inversely proportional to the magnitude of the video-signal voltage Vsig.

By generating the write pulse WS to be applied to the gate electrode of the signal writing transistor 23 to have a waveform with a falling edge shown in the waveform diagram of FIG. 11, the correction time t can be made inversely proportional to the video-signal voltage Vsig. This is because the signal writing transistor 23 enters a cut-off state when the difference in electric potential between the gate and source electrodes of the signal writing transistor 23 becomes equal to the threshold voltage Vth of the signal writing transistor 23.

To put it concretely, as is obvious from the waveform diagram of FIG. 11, when the video-signal voltage Vsig (white) for the white level is applied to the source electrode of the signal writing transistor 23, the signal writing transistor 23 enters a cut-off state when the difference in electric potential between the gate and source electrodes of the signal writing transistor 23 becomes equal to (Vsig (white)+Vth). Thus, in this case, the correction time t (white) of the mobility correction process is set at the smallest value. When the video-signal voltage Vsig (grey) for the grey level is applied to the source electrode of the signal writing transistor 23, on the other hand, the signal writing transistor 23 enters a cut-off state when the difference in electric potential between the gate and source electrodes of the signal writing transistor 23 becomes equal to (Vsig (grey)+Vth). Thus, in this case, the correction time t (grey) of the mobility correction process is set at a value greater than the value of the correction time t (white).

By setting the correction time t of the mobility correction process at a value inversely proportional to the video-signal voltage Vsig as described above, an optimum correction time t of the mobility correction process can be made corresponding to the video-signal voltage Vsig. It is thus possible to eliminate the dependence of the drain-source current Ids flowing between the drain and source electrodes of the device driving transistor 22 on the mobility μ with a higher degree of reliability throughout the entire level range of the video-signal voltage Vsig, from the black level to the white level, that is, it is possible to eliminate the dependence for all gradations.

Figure 12:
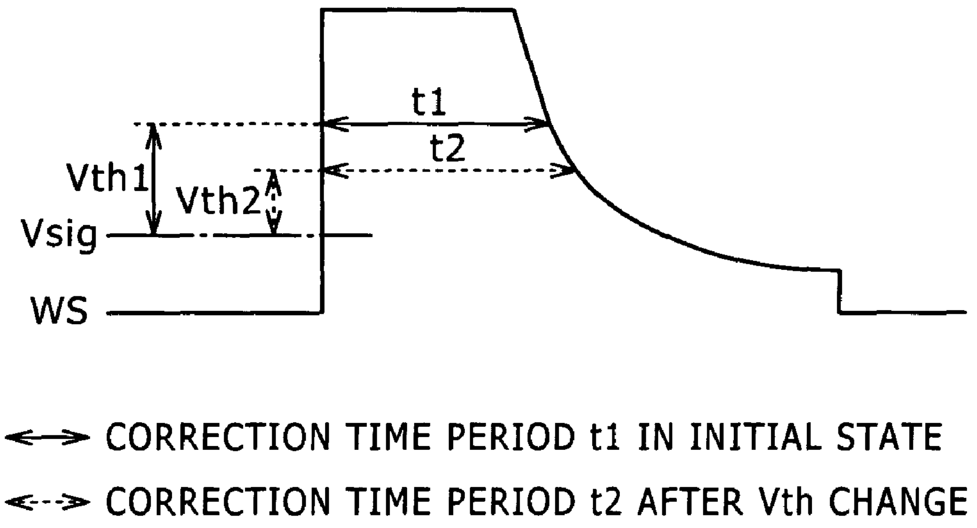
FIG. 12 is an explanatory waveform diagram to be referred to in description of a problem raised by a shift caused by a negative bias voltage applied to the gate electrode of a signal writing transistor during a light emission period as a shift of the Vth characteristic of the device driving transistor toward a depletion side.

By the way, the negative bias voltage applied to the gate electrode of the signal writing transistor 23 in a light emission period as described above shifts the Vth characteristic of the signal writing transistor 23 from a characteristic in an enhancement state to a characteristic in a depletion state as described earlier. To put it more concretely, the threshold voltage Vth of the signal writing transistor 23 is changed from Vth1 of an initial state to Vth2 lower than the threshold voltage Vth1 as shown in a diagram of FIG. 12, shifting the operating point of the mobility correction process. Thus, the correction time t of the mobility correction process changes from a time period t1 of the initial state to a time period t2 longer than the time period t1.

If the correction time t of the mobility correction process becomes longer, the mobility correction process is carried out excessively. The light emission current (or the driving current) Ids flowing between the drain and source electrodes of the organic EL device 21 is expressed by Eq. (4) as follows:

$$Ids=k\mu[Vsig/\{1+Vsig(k\mu/C)t\}]^2 \quad (4)$$

As is obvious from Eq. (4), if the correction time t of the mobility correction process becomes longer and the mobility correction process is thus carried out excessively, the light emission current (or the driving current) Ids flowing through the organic EL device 21 gradually decreases, causing the luminance of the display panel to deteriorate with the lapse of time.

Characteristics of the Embodiment

When no current is flowing through the device driving transistor 22 or, to put it more concretely, when the low electric potential Vini is asserted on the power-supply line 32 connected to the device driving transistor 22 during a no-light emission period of the organic EL device 21 in the active-matrix organic EL display apparatus 10 according to the embodiment, a positive bias voltage is applied to the gate electrode of the signal writing transistor 23. A positive bias voltage is a bias voltage higher than the minimum amplitude level of the video-signal voltage Vsig.

To put it concretely, the write scan circuit 40 applies a write pulse WS to the gate electrode of the signal writing transistor 23 through the scan line 31 (that is, one of the scan lines 31-1 to 31-*m*) in order to carry out a threshold-voltage correction process and to carry out a mobility correction process as well as a signal writing operation. The write scan circuit 40 applies this write pulse WS to the gate electrode of the signal writing transistor 23 through the scan line 31 also at the time t2 shown in the timing/waveform diagram of FIG. 4 when no current is flowing through the device driving transistor 22 during a no-light emission period of the organic EL device 21 in order to carry out preparation for the threshold-voltage correction process.

Figure 13:
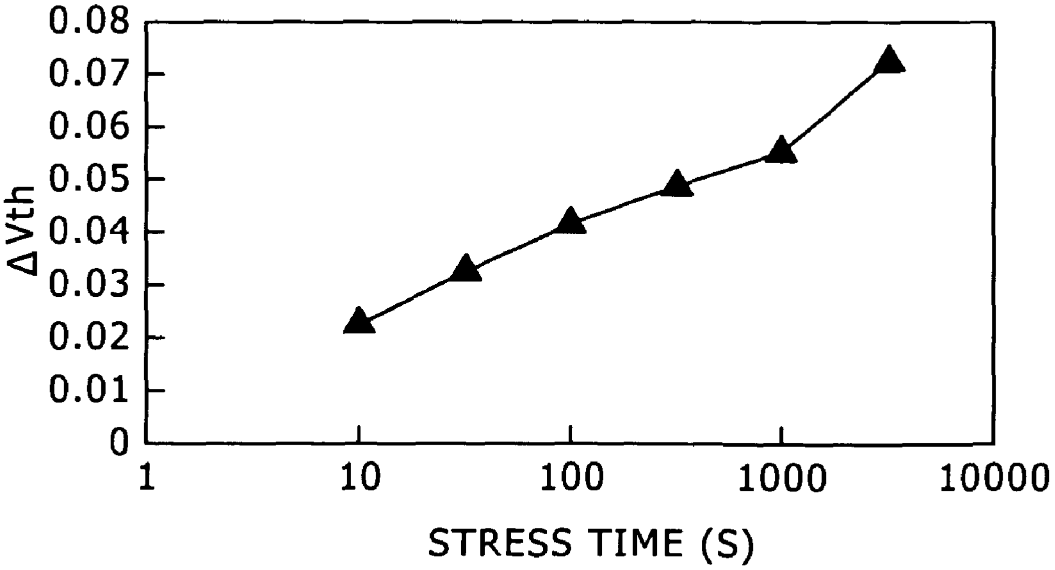
FIG. 13 is a diagram showing a curve representing a typical characteristic of the relation between the threshold voltage Vth of a transistor and the stress time period during which a positive bias voltage is applied to the gate electrode of the transistor.

In general, a positive bias voltage applied to the gate electrode of a transistor shifts the Vth characteristic of the transistor toward the enhancement side. FIG. 13 is a diagram showing a curve representing a typical characteristic of the relation between the threshold voltage Vth of a transistor and the stress time period during which a positive bias voltage is applied to the gate electrode of the transistor which is the signal writing transistor 23 in this case. In the diagram of FIG. 13, the horizontal axis represents the stress time period during which a positive bias voltage is being applied to the gate electrode of the signal writing transistor 23. On the other hand, the vertical axis represents the change ΔVth in threshold voltage Vth.

As is obvious from the characteristic shown in the diagram of FIG. 13, the longer the stress time period, the larger the change ΔVth in threshold voltage Vth, that is, the more the threshold voltage Vth becomes higher, indicating a bigger shift of the Vth characteristic of the transistor toward the enhancement side.

As described above, when no current is flowing through the device driving transistor 22 during a no-light emission period of the organic EL device 21 or, to put it more concretely, when a low electric potential Vini is asserted on the power-supply line 32 connected to the device driving transistor 22, a positive bias voltage is applied to the gate electrode of the signal writing transistor 23 in order to shift the Vth characteristic of the device driving transistor 23 toward the enhancement side in a preparation for a mobility correction process.

When a positive bias voltage is applied to the gate electrode of the signal writing transistor 23 or, to put it more concretely, when a write pulse WS is applied to the gate electrode of the signal writing transistor 23, the signal writing transistor 23 is put in a conductive state, changing an electric potential appearing on the gate electrode of the device driving transistor 22. Since no current is flowing through the device driving transistor 22, however, the organic EL device 21 remains in the no-light emission state as it is.

That is to say, when no current is flowing through the device driving transistor 22, an operation to apply a positive bias voltage to the gate electrode of the signal writing transistor 23 in order to shift the Vth characteristic of the signal writing transistor 23 toward the enhancement side does not have an effect on the emission of light and the emission of no light from the organic EL device 21.

In addition, the shift of the Vth characteristic of the signal writing transistor 23 toward the enhancement side in the no light emission period can reduce or, desirably, neutralize a shift caused by a negative bias voltage applied to the gate electrode of the signal writing transistor 23 in the light emission period as a shift of the Vth characteristic of the signal writing transistor 23 toward the depletion side.

It is thus possible to prevent the operating point of the mobility correction process from changing and, therefore, carry out a mobility correction process during an optimum correction time period t. As a result, it is possible to prevent the light emission current of the organic EL device 21 from decreasing because of the fact that the Vth characteristic is shifted to the depletion side due to a negative bias voltage applied to the gate electrode of the signal writing transistor 23 during a light emission period. Accordingly, it is possible to prevent the luminance of the display panel 70 from deteriorating with the lapse of time in a time degradation process.

In order to increase the effect of a shift caused by a positive bias voltage applied to the gate electrode of the signal writing transistor 23 as a shift of the Vth characteristic of the signal writing transistor 23 toward the enhancement side, it is desirable to set the magnitude of the positive bias voltage (or, to put it concretely, the waveform height of the write pulse WS) at a large possible value in a range tolerable to the signal writing transistor 23.

The following description explains a concrete embodiment for applying a positive bias voltage to the gate electrode of the signal writing transistor 23 when no current is flowing through the device driving transistor 22 during a no-light emission period of the organic EL device 21.

First Embodiment

Figure 14:
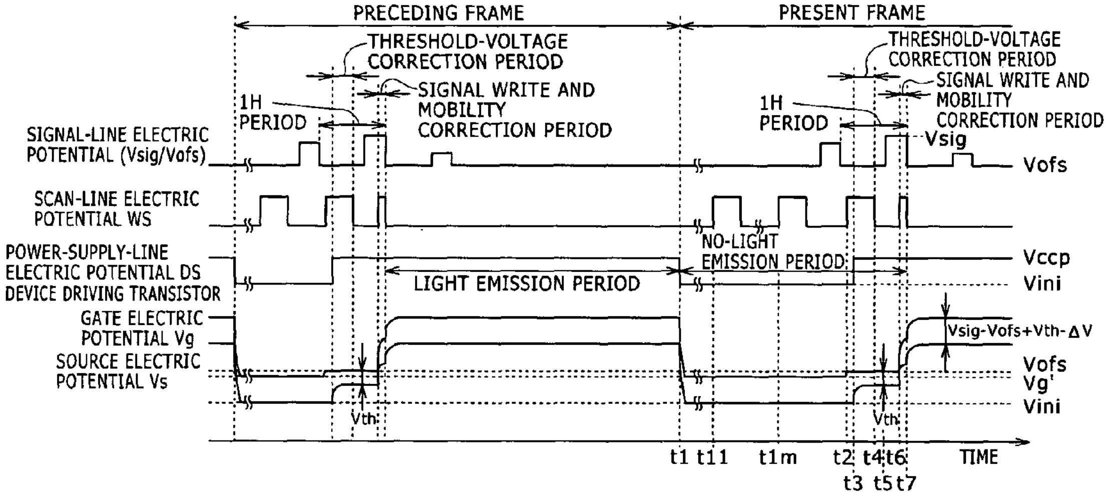
FIG. 14 is a timing/waveform diagram to be referred to in description of circuit operations which are carried out in accordance with a driving method provided by a first embodiment.

FIG. 14 is a timing/waveform diagram referred to in description of circuit operations which are carried out in accordance with a driving method provided by a first embodiment.

As shown in the timing/waveform diagram of FIG. 14, at a time t1, a new frame referred to as the present frame arrives. Then, at a time t2, an electric potential Vg applied to the gate electrode of the device driving transistor 22 is initialized at the reference electric potential Vofs whereas an electric potential Vs applied to the source electrode of the device driving transistor 22 is initialized at the low electric potential Vini. After the initialization processes, during a period between times t3 and t4, a threshold-voltage correction process is carried out and, during a period between times t6 and t7, a signal writing operation to store the video-signal voltage Vsig into the signal storage capacitor 24 as well as a mobility correction process are carried out. The processing series composed of the threshold-voltage correction process, the signal writing operation and the mobility correction process is carried out in the same way as the basic circuit operations explained earlier.

In addition to the processing series, in accordance with the driving method provided by the first embodiment, when no current is flowing through the device driving transistor 22 during a no-light emission period of the organic EL device 21 prior to the threshold-voltage correction period, a positive bias voltage is applied to the gate electrode of the signal writing transistor 23 or, to put it concretely, the electric potential WS is set at an active level (or a high level) and applied to the gate electrode of the signal writing transistor 23. The positive bias voltage is applied to the gate electrode of the signal writing transistor 23 in at least at a time in a 1H period leading ahead of the threshold-voltage correction period of the pixel row, to which the signal writing transistor 23 pertains, in synchronization with a threshold-voltage correction process carried out on another pixel row. As shown in the timing/waveform diagram of FIG. 14, the threshold-voltage correction period of the pixel row, to which the signal writing transistor 23 pertains, starts at the time t3. Typically, the positive bias voltage is applied to the gate electrode of the signal writing transistor 23 several times, for example, at a plurality of different times t11 to t1*m* each included in one of the same plurality of 1H periods leading ahead of the threshold-voltage correction period of the pixel row, to which the signal writing transistor 23 pertains. The threshold-voltage correction process carried out on another pixel row includes the process to initialize the electric potential appearing on the gate electrode of the device driving transistor 22 on the other row.

In the operation to apply the positive bias voltage to the gate electrode of the signal writing transistor 23 several times, for example, at a plurality of different times t11 to t1*m* each included in one of the same plurality of 1H periods as described above, it is desirable to apply the positive bias voltage to the gate electrode by setting the electric potential WS in an active state intermittently during the 1H periods in such a way that the electric potential WS is put in the active state once for each of the 1H periods while an electric potential appearing on the signal line 33 is being set at the reference electric potential Vofs. The positive bias voltage is applied to the gate electrode of the signal writing transistor 23 in this way for the following reason.

If the electric potential WS is put in an active state a plurality of times, signal writing transistors 23 provided on a plurality of rows as transistors connected to the same signal line 33 are put in a conductive state with the same timing so that the capacitance of the signal line 33 undesirably increases. If the capacitance of a signal line 33 increases, the transient response of the signal line 33 undesirably worsens.

In particular, if the transient response of the signal line 33 worsens while the video-signal voltage Vsig is being written into another pixel row, the signal write period undesirably ends before the operation to write the video-signal voltage Vsig is finished so that the video-signal voltage Vsig cannot be written sufficiently. As a result, the picture quality and the luminance deteriorate undesirably. For this reason, it is desirable to apply the positive bias voltage to the gate electrode of the signal writing transistor 23 by setting the electric potential WS in an active state intermittently during a plurality of 1H periods in such a way that the electric potential WS is put in the active state once for each of the 1H periods while an electric potential appearing on the signal line 33 is being set at the reference electric potential Vofs.

Second Embodiment

Figure 15:
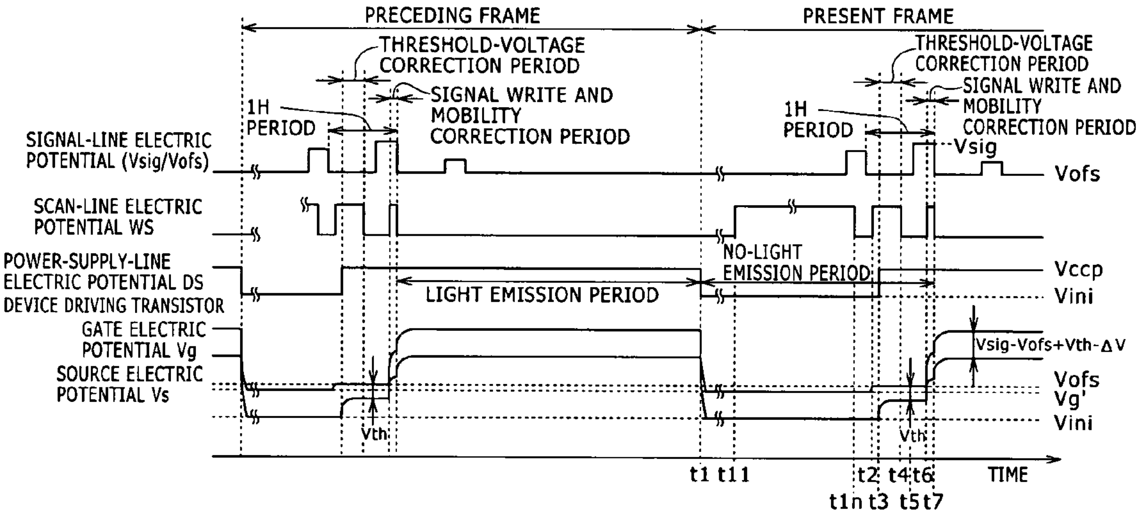
FIG. 15 is a timing/waveform diagram to be referred to in description of circuit operations which are carried out in accordance with a driving method provided by a second embodiment.

FIG. 15 is a timing/waveform diagram referred to in description of circuit operations which are carried out in accordance with a driving method provided by a second embodiment.

In the case of the first embodiment, the positive bias voltage is applied to the gate electrode of the signal writing transistor 23 by setting the electric potential WS in an active state intermittently during a plurality of 1H periods in such a way that the electric potential WS is put in the active state once during each of the 1H periods while an electric potential appearing on the signal line 33 is being set at the reference electric potential Vofs. In the case of the second embodiment, on the other hand, a positive bias voltage is also applied to the gate electrode of the signal writing transistor 23 or, to put it concretely, the electric potential WS is set at an active level (or a high level) and applied to the gate electrode of the signal writing transistor 23 but the positive bias voltage is continuously applied to the gate electrode of the signal writing transistor 23 during a period starting at a time leading ahead of the threshold-voltage correction process carried out on the pixel row, to which the signal writing transistor 23 pertains. For example, the electric potential WS set at an active level is continuously applied to the gate electrode of the signal writing transistor 23 throughout a plurality of 1H periods starting at the time t11 cited earlier and ending at a time t1*n*.

By continuously applying the electric potential WS set at an active level to the gate electrode of the signal writing transistor 23 throughout a plurality of 1H periods in this way, even though the transient response of the signal line 33 worsens as described above, the period during which the positive bias voltage is being continuously applied to the gate electrode can be assured to last for a long period of time in comparison with the first embodiment in which the electric potential WS set at an active level is applied intermittently to the gate electrode. Thus, it is possible to obtain a big effect of a shift caused by applying a positive bias voltage to the gate electrode of the signal writing transistor 23 as the shift of the Vth characteristic toward the enhancement side.

Other Modified Versions

Each of the embodiments described above implements a driving method for carrying out a threshold-voltage correction process only once. However, the scope of the present invention is by no means limited to these embodiments. That is to say, a threshold-voltage correction process can be carried out not only once during a specific horizontal scan period along with a signal writing operation and a mobility correction process, but also a plurality of times during a plurality of horizontal scan periods leading ahead of the specific horizontal scan period by executing the threshold-voltage correction process once during each of the horizontal scan periods including the specific horizontal scan period. Thus, the present invention can also be applied in the same way to a driving method for carrying out the so-called distributed Vth correction processes.

By splitting a threshold-voltage correction period into a specific horizontal scan period used for carrying out a threshold-voltage correction process along with a signal writing operation and a mobility correction process and a plurality of horizontal scan periods leading ahead of the specific horizontal scan period as described above, even if the time allocated to 1 horizontal scan period becomes shorter due to a larger pixel count accompanying image higher definition, it is possible to assure allocation of sufficient time to the threshold-voltage correction period. Thus, the threshold voltage Vth of the device driving transistor 22 can be detected with a high degree of reliability and stored in the signal storage capacitor 24. As a result, the threshold-voltage correction process can also be carried out with a high degree of reliability.

In addition, also in accordance with the driving method for carrying out the so-called distributed Vth (threshold-voltage) correction processes, it is possible to prevent the light emission current of the organic EL device 21 from decreasing because of the fact that the Vth characteristic is shifted to the depletion side due to a negative bias voltage applied to the gate electrode of the signal writing transistor 23 during a light emission period in which a current is flowing through the device driving transistor 22 by applying a positive bias voltage to the gate electrode of the signal writing transistor 23 when no current is flowing through the device driving transistor 22. Accordingly, it is possible to prevent the luminance of the display panel 70 from deteriorating with the lapse of time in a time degradation process.

On top of that, each of the embodiments described above implements a driving method, in accordance with which, a positive bias voltage set at a high level is applied to the gate electrode of the signal writing transistor 23 when no current is flowing through the device driving transistor 22 because the positive bias voltage set at the high level represents the active state of the electric potential WS applied to the gate electrode of the signal writing transistor 23 which is an N-channel transistor. In the case of a pixel circuit 20 employing a P-channel transistor as the signal writing transistor 23, on the other hand, a negative bias voltage set at a low level is applied to the gate electrode of the signal writing transistor 23. That is to say, when no current is flowing through the device driving transistor 22, the driving method applies a bias voltage having a polarity opposite to the polarity of a bias voltage which is applied to the gate electrode of the signal writing transistor 23 in order to put the signal writing transistor 23 in a non-conductive state.

In addition, each of the embodiments described above is applied to an active-matrix organic EL display apparatus 10 employing pixel circuits 20 each having a configuration in which:

the power-supply electric potential DS supplied to the device driving transistor 22 can be switched from the first power-supply electric potential Vccp to the second power-supply electric potential Vini and vice versa;

a transistor for controlling the light emission state and the no-light emission state of the organic EL device 21 is eliminated;

a transistor for initializing an electric potential Vs appearing on the source electrode of the device driving transistor 22 is eliminated;

the reference electric potential Vofs is supplied as the gate electric potential Vg to the gate electrode of the device driving transistor 22 by way of the signal writing transistor 23 from the same signal line 33 supplying the video-signal voltage Vsig as the gate electric potential Vg to the gate electrode of the device driving transistor 22 by way of the signal writing transistor 23; and a transistor for initializing an electric potential Vg appearing on the gate electrode of the device driving transistor 22 is thus eliminated.

However, the scope of the present invention is by no means limited to these embodiments.

For example, an embodiment of the present invention can also be applied to an active-matrix organic EL display apparatus 10 employing pixel circuits 20 each having a configuration in which, in addition to the device driving transistor 22 and the signal writing transistor 23:

a transistor for controlling the light emission state and the no-light emission state of the organic EL device 21 is employed;

a transistor for initializing an electric potential Vs appearing on the source electrode of the device driving transistor 22 is employed; and/or a transistor for initializing an electric potential Vg appearing on the gate electrode of the device driving transistor 22 is employed.

On top of that, even though each of the embodiments described above is applied to an active-matrix organic EL display apparatus 10 employing pixel circuits 20 each having an organic EL device as the electro optical device, the scope of the present invention is by no means limited to these embodiments. To put it concretely, the present invention can be applied to general display apparatus each employing pixel circuits each having a current-driven electro optical device (or a light emitting device) for emitting light with a luminance according to the magnitude of a current flowing through the device. Examples of such a current-driven electro optical device are the inorganic EL device, an LED (Light Emitting Diode) device and a semiconductor laser device.

In addition, it should be understood by those skilled in the art that a variety of modifications, combinations, sub-combinations and alterations may occur, depending on design requirements and other factors as far as they are within the scope of the appended claims or the equivalents thereof.

APPLICATION EXAMPLES

The display apparatus according to the present invention described above is typically employed in a variety of electronic instruments shown in diagrams of FIGS. 16 to 20G as instruments used in all fields. Examples of the electronic instruments are a digital camera, a laptop personal computer, a portable terminal such as a cellular phone and a video camera. In each of these electronic instruments, the display apparatus is used for displaying a video signal supplied thereto or generated therein as an image or a video.

By employing the display apparatus according to the present invention in a variety of electronic instruments used in all fields as the display unit of each of the instruments, as is obvious from the embodiments described previously, the display apparatus provided by embodiments of the present invention is capable of preventing the light emission current of the organic EL device 21 from decreasing because of the fact that the Vth characteristic is shifted to the depletion side due to a negative bias voltage applied to the gate electrode of the signal writing transistor 23 during a light emission period in which a current is flowing through the device driving transistor 22. Accordingly, it is possible to prevent the luminance of the display panel 70 from deteriorating with the lapse of time in a time degradation process. As a result, each of the electronic instruments is capable of displaying an image having a high quality.

It is to be noted that the display apparatus according to the present invention include an apparatus constructed into a modular shape with a sealed configuration. For example, the display apparatus according to the present invention is designed into configuration in which the pixel array section 30 is implemented as a display module created by attaching the module to a facing unit made of a material such as transparent glass. On the transparent facing unit, components such as a color filter and a protection film can be created in addition to a shielding film described earlier. It is to be noted that the display module serving as the pixel array section 30 may include components such as a circuit for supplying a signal received from an external source to the pixel array section 30, a circuit for supplying a signal received from the pixel array section 30 to an external destination and an FPC (Flexible Print Circuit).

The following description explains concrete implementations of the electronic instrument to which the present invention is applied.

Figure 16:
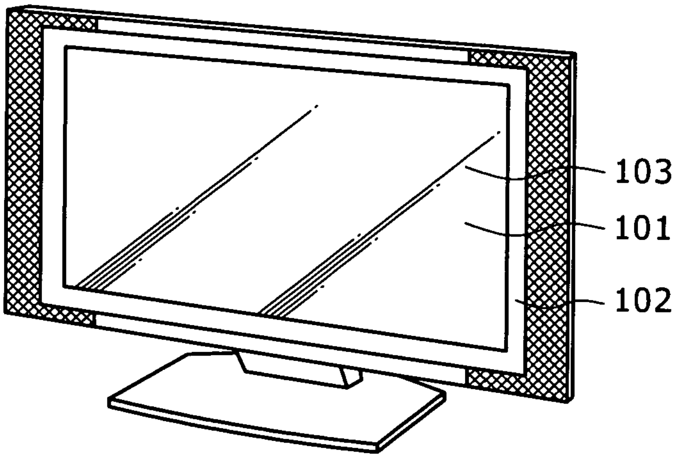
FIG. 16 is a diagram showing a squint view of the external appearance of a TV set to which an embodiment of the present invention is applied.

FIG. 16 is a diagram showing a squint view of the external appearance of a TV set to which an embodiment of the present invention is applied. The TV set serving as a typical implementation of the electronic instrument according to the application example employs a front panel 102 and a video display screen section 101 which is typically a filter glass plate 103. The TV set is constructed by employing the display apparatus provided by the present invention in the TV set as the video display screen section 101.

Figure 17A:
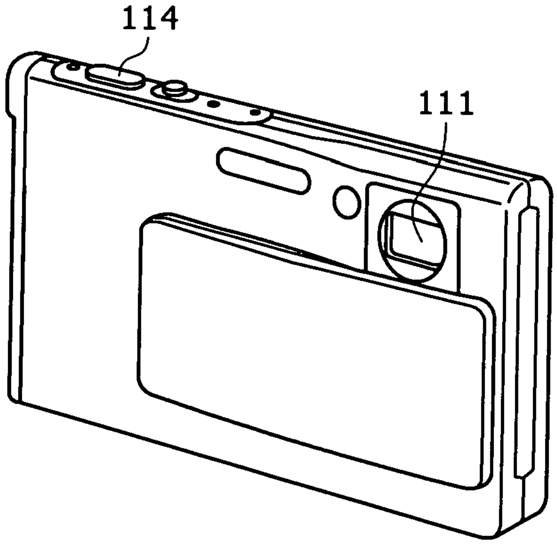
FIGS. 17A and 17B are a plurality of diagrams each showing a squint view of the external appearance of a digital camera to which an embodiment of the present invention is applied.
Figure 17B:
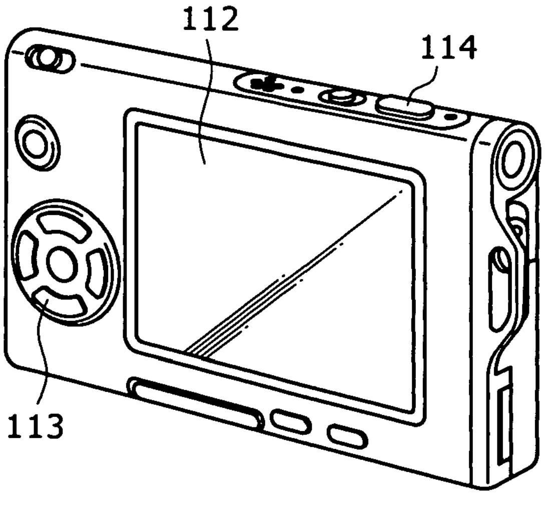

FIGS. 17A and 17B are a plurality of diagrams each showing a squint view of the external appearance of a digital camera to which an embodiment of the present invention is applied. To be more specific, FIG. 17A is a diagram showing a squint view of the external appearance of the digital camera seen from a position on the front side of the digital camera whereas FIG. 17B is a diagram showing a squint view of the external appearance of the digital camera seen from a position on the rear side of the digital camera. The digital camera serving as a typical implementation of the electronic instrument according to the application example employs a light emitting section 111 for generating a flash, a display section 112, a menu switch 113 and a shutter button 114. The digital camera is constructed by employing the display apparatus provided by the present invention in the digital camera as the display section 112.

Figure 18:
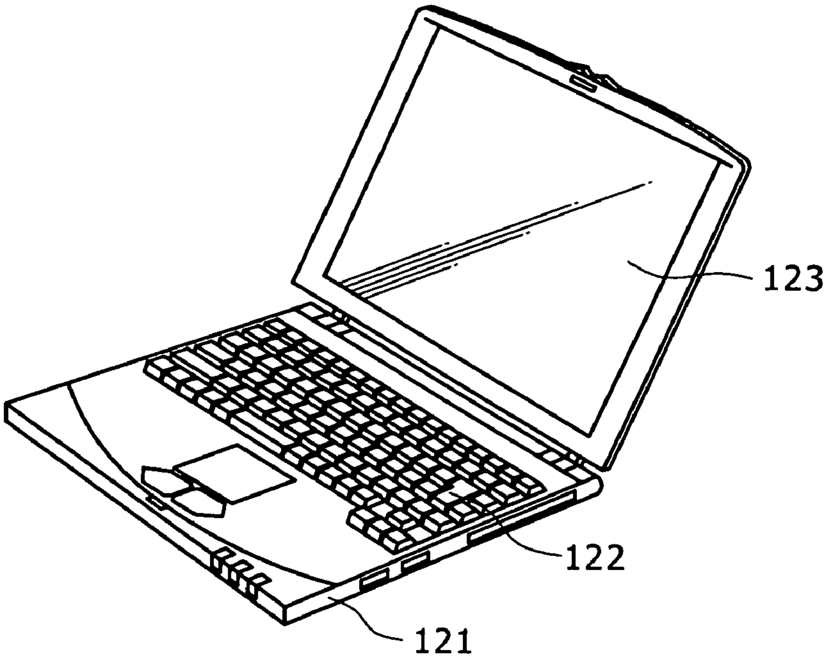
FIG. 18 is a diagram showing a squint view of the external appearance of a laptop personal computer to which an embodiment of the present invention is applied.

FIG. 18 is a diagram showing a squint view of the external appearance of a laptop personal computer to which an embodiment of the present invention is applied. The laptop personal computer serving as a typical implementation of the electronic instrument according to the application example employs a main body 121 including a keyboard 122 to be operated by the user for entering characters and a display section 123 for displaying an image. The laptop personal computer is constructed by employing the display apparatus provided by the present invention in the personal computer as the display section 123.

Figure 19:
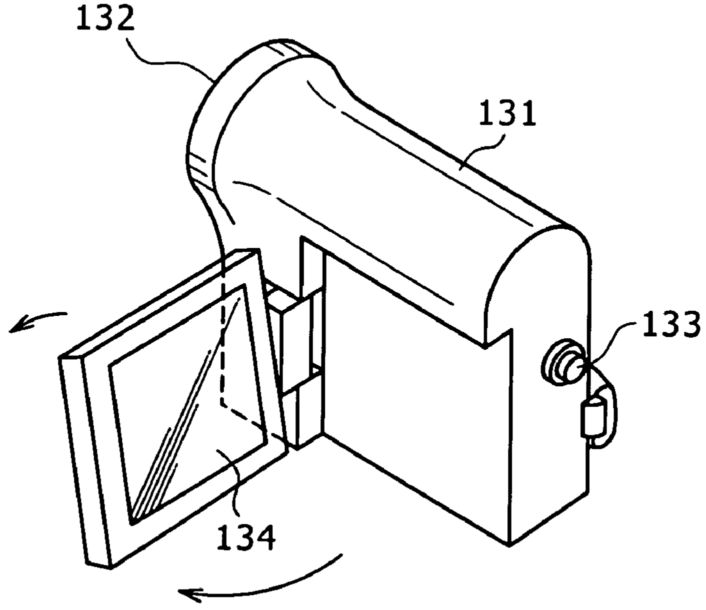
FIG. 19 is a diagram showing a squint view of the external appearance of a video camera to which an embodiment of the present invention is applied.

FIG. 19 is a diagram showing a squint view of the external appearance of a video camera to which an embodiment of the present invention is applied. The video camera serving as a typical implementation of the electronic instrument according to the application example employs a main body 131, a photographing lens 132, a start/stop switch 133 and a display section 134. Provided on the front face of the video camera, the photographing lens 132 oriented forward is a lens for taking a picture of a subject of photographing. The start/stop switch 133 is a switch to be operated by the user to start or stop a photographing operation. The video camera is constructed by employing the display apparatus provided by the present invention in the video camera as the display section 134.

FIGS. 20A to 20G are a plurality of diagrams each showing the external appearance of a portable terminal such as a cellular phone to which an embodiment of the present invention is applied. To be more specific, FIG. 20A is a diagram showing the front view of the cellular phone in a state of being already opened. FIG. 20B is a diagram showing a side of the cellular phone in a state of being already opened. FIG. 20C is a diagram showing the front view of the cellular phone in a state of being already closed. FIG. 20D is a diagram showing the left side of the cellular phone in a state of being already closed. FIG. 20E is a diagram showing the right side of the cellular phone in a state of being already closed. FIG. 20F is a diagram showing the top view of the cellular phone in a state of being already closed. FIG. 20G is a diagram showing the bottom view of the cellular phone in a state of being already closed. The cellular phone serving as a typical implementation of the electronic instrument according to the application example employs an upper case 141, a lower case 142, a link section 143 which is a hinge, a display section 144, a display sub-section 145, a picture light 146 and a camera 147. The cellular phone is constructed by employing the display apparatus provided by the present invention in the cellular phone as the display section 144 and the display sub-section 145.

What is claimed is:

1. A display apparatus comprising:

a pixel array section including pixel circuits laid out to form a matrix, the pixel circuits each having a signal writing transistor for writing a video signal into a signal storage capacitor, said signal storage capacitor for storing a video signal written by said signal writing transistor, a device driving transistor for driving an electro optical device in accordance with the video signal stored in said signal storage capacitor, and said electro optical device for emitting light according to the video signal; and a pixel driving section configured to drive each of said pixel circuits included in said pixel array section, wherein in a no-light emission period of said electro optical device, said pixel driving section carries out a threshold-voltage correction process that provides an initialization electric potential at the gate electrode of said device driving transistor and that changes an electric potential appearing on a current electrode of said device driving transistor toward an electric potential obtained as a result of subtracting the threshold voltage of said device driving transistor from said initialization electric potential, and when a current is not flowing through said device driving transistor, said pixel driving section applies a positive bias voltage to the gate electrode of said signal writing transistor, wherein said pixel driving section applies said positive bias voltage to said gate electrode of said signal writing transistor continuously throughout a plurality of horizontal scan periods before a horizontal scan period during which said threshold-voltage correction process occurs.

2. The display apparatus according to claim 1, wherein:

said initialization electric potential is supplied to said pixel circuit through a signal line for supplying a video signal to said pixel circuit at selected time slots; and said pixel driving section supplies said positive bias voltage to said gate electrode of said signal writing transistor when said initialization electric potential is being asserted on said signal line.

3. A driving method for driving a display apparatus having a pixel array section including pixel circuits laid out to form a matrix, the pixel circuits each having a signal writing transistor for writing a video signal into a signal storage capacitor, said signal storage capacitor for storing a video signal written by said signal writing transistor, a device driving transistor for driving an electro optical device in accordance with the video signal stored in said signal storage capacitor, and said electro optical device for emitting light according to the video signal the method comprising:

carrying out, in a no-light emission period of said electro optical device, a threshold-voltage correction process that provides an initialization electric potential at the gate electrode of said device driving transistor and that changes an electric potential appearing on a current terminal of said device driving transistor toward an electric potential obtained as a result of subtracting the threshold voltage of said device driving transistor from said initialization electric potential, and applying, when a current is not flowing through said device driving transistor, a positive bias voltage to said gate electrode of said signal writing transistor, said positive bias voltage being applied to said gate electrode of said signal writing transistor continuously throughout a plurality of horizontal scan periods before a horizontal scan period during which said threshold-voltage correction process occurs.

4. An electronic instrument employing a display apparatus comprising:

a pixel array section including pixel circuits laid out to form a matrix, the pixel circuits each having a signal writing transistor for writing a video signal into a signal storage capacitor, said signal storage capacitor for storing a video signal written by said signal writing transistor, a device driving transistor for driving an electro optical device in accordance with the video signal stored in said signal storage capacitor, and said electro optical device for emitting light according to the video signal; and a pixel driving section configured to drive each of said pixel circuits included in said pixel array section, wherein in a no-light emission period of said electro optical device, said pixel driving section carries out a threshold-voltage correction process that provides an initialization electric potential at the gate electrode of said device driving transistor and that changes an electric potential appearing on a current electrode of said device driving transistor toward an electric potential obtained as a result of subtracting the threshold voltage of said device driving transistor from said initialization electric potential, and when a current is not flowing through said device driving transistor, said pixel driving section applies a positive bias voltage to said gate electrode of said signal writing transistor, wherein said pixel driving section applies said positive bias voltage to said gate electrode of said signal writing transistor continuously throughout a plurality of horizontal scan periods before a horizontal scan period during which said threshold-voltage correction process occurs.

* * * * *